US 11,254,449 B2

United States Patent
Pountney et al.

(10) Patent No.: US 11,254,449 B2
(45) Date of Patent: *Feb. 22, 2022

(54) SERVICING OF LANDING GEAR SHOCK ABSORBERS

(71) Applicant: AIRBUS OPERATIONS LIMITED, Bristol (GB)

(72) Inventors: Oliver Pountney, Bristol (GB); Alan Shepherd, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 167 days.

This patent is subject to a terminal disclaimer.

(21) Appl. No.: 16/444,661

(22) Filed: Jun. 18, 2019

(65) Prior Publication Data

US 2019/0329908 A1    Oct. 31, 2019

Related U.S. Application Data

(62) Division of application No. 15/204,548, filed on Jul. 7, 2016, now Pat. No. 10,358,236.

(30) Foreign Application Priority Data

Jul. 10, 2015    (GB) .................................... 1512144

(51) Int. Cl.
*B64F 5/40* (2017.01)
*B64C 25/60* (2006.01)
(Continued)

(52) U.S. Cl.
CPC ................ *B64F 5/40* (2017.01); *B64C 25/60* (2013.01); *B64D 45/0005* (2013.01); *B64F 5/60* (2017.01);
(Continued)

(58) Field of Classification Search
CPC ... B64F 5/40; B64F 5/60; B64C 25/60; B64C 2025/008; B64D 45/0005
See application file for complete search history.

(56) References Cited

U.S. PATENT DOCUMENTS 2,955,625 A ‡ 10/1960 Patterson ................ B64C 25/60
                                                        141/49
3,889,904 A ‡ 6/1975 Jones ...................... B64C 25/60
                                                        244/10

(Continued)

FOREIGN PATENT DOCUMENTS

EP    2937591        10/2015
EP    2937591 A2 ‡  10/2015
(Continued)

OTHER PUBLICATIONS

Search Report dated Jan. 12, 2016 for Great Britain Application No. 1512144.5.‡

(Continued)

*Primary Examiner* — Timothy P. Kelly
(74) *Attorney, Agent, or Firm* — Nixon & Vanderhye P.C.

(57) ABSTRACT

A method and portable apparatus for servicing a shock absorber on a landing gear assembly of an aircraft in a weight-on-wheels state is disclosed. The shock absorber includes at least one chamber containing both hydraulic fluid and a gas in fluid communication with each other. The apparatus includes a source of gas and a source of hydraulic fluid. The amount of hydraulic fluid in the chamber is corrected, preferably such that the chamber is then filled with a known amount of degassed hydraulic fluid. A pre-set mass of gas is then delivered into the chamber under the control of a gas delivery system of the portable apparatus. More accurate servicing of a shock absorber may thus be provided since account is additionally taken of gas dissolved in hydraulic fluid. By delivering a pre-set mass of gas into (Continued)

the chamber, there is no need to rely on a measure of gas pressure or H-dimension (h) when servicing the shock absorber.

17 Claims, 14 Drawing Sheets

(51) Int. Cl.
*B64D 45/00* (2006.01)
*F16F 9/32* (2006.01)
*G01M 17/007* (2006.01)
*G01M 17/013* (2006.01)
*G01M 17/02* (2006.01)
*B64F 5/60* (2017.01)
*G01M 17/04* (2006.01)

(52) U.S. Cl.
CPC .......... *F16F 9/3264* (2013.01); *F16F 9/3271* (2013.01); *G01M 17/007* (2013.01); *G01M 17/013* (2013.01); *G01M 17/02* (2013.01); *G01M 17/04* (2013.01); *Y02P 70/50* (2015.11)

(56) References Cited

U.S. PATENT DOCUMENTS

| | | | | |
|---|---|---|---|---|
| 5,148,896 | A ‡ | 9/1992 | Ralph | B64C 25/60 188/31 |
| 6,125,882 | A ‡ | 10/2000 | Kong | B64C 17/10 137/21 |
| 2010/0187353 | A1 ‡ | 7/2010 | Masson | B64C 25/60 244/10 |
| 2012/0053783 | A1 ‡ | 3/2012 | Nance | G01M 17/04 701/33 |
| 2012/0253591 | A1 ‡ | 10/2012 | Nance | B64C 25/60 701/34 |
| 2015/0101403 | A1 ‡ | 4/2015 | Shepherd | G01F 22/00 73/149 |
| 2015/0154819 | A1 ‡ | 6/2015 | Wilson | G01M 17/04 701/33 |
| 2015/0266569 | A1 ‡ | 9/2015 | Fazeli | B64C 25/60 29/402 |
| 2016/0023640 | A1* | 1/2016 | Casale | F01M 11/04 141/94 |
| 2016/0101877 | A1 ‡ | 4/2016 | Shepherd | G01F 23/296 29/402 |
| 2019/0270515 | A1* | 9/2019 | Rogiers | B64F 5/40 |

FOREIGN PATENT DOCUMENTS

| | | | |
|---|---|---|---|
| GB | 1231839 | 5/1971 | |
| GB | 1231839 A ‡ | 5/1971 | .............. A62C 3/06 |
| GB | 2514336 | 11/2014 | |
| GB | 2514336 A ‡ | 11/2014 | |
| JP | 11171097 | 6/1999 | |
| JP | 11171097 A ‡ | 6/1999 | |
| WO | 0035752 | 6/2000 | |
| WO | WO-0035752 A1 ‡ | 6/2000 | ............ B64C 17/10 |
| WO | 2013160691 | 10/2013 | |
| WO | WO-2013160691 A1 ‡ | 10/2013 | |
| WO | 2013178998 | 12/2013 | |
| WO | WO-2013178998 A2 ‡ | 12/2013 | |
| WO | 2014184521 | 11/2014 | |
| WO | WO-2014184521 A1 ‡ | 11/2014 | |

OTHER PUBLICATIONS

Search Report dated May 26, 2016 for Great Britain Application No. 1512144.5.‡
Search Report dated Jan. 12, 2016 for Great Britain Application No. 1512143.7.‡
Search Report dated May 24, 2016 for Great Britain Application No. 1512143.7.‡
Alan Shepherd et al. presentation; entitled "Nitrogen Absorption and Desorption in Landing Gear Shock Absorbers"; as presented to the A-5 Aerospace Landing Gear Systems Committee of SAE International (see https://www.sae.org/servlets/works/committeeHome.do?comtID=TEAA5) in Dublin during Oct. 2013.‡
European Search Report dated Dec. 8, 2016 EP Application No. 16178748.‡
European Search Report dated Dec. 9, 2016 EP Application No. 16178749.‡

\* cited by examiner
‡ imported from a related application

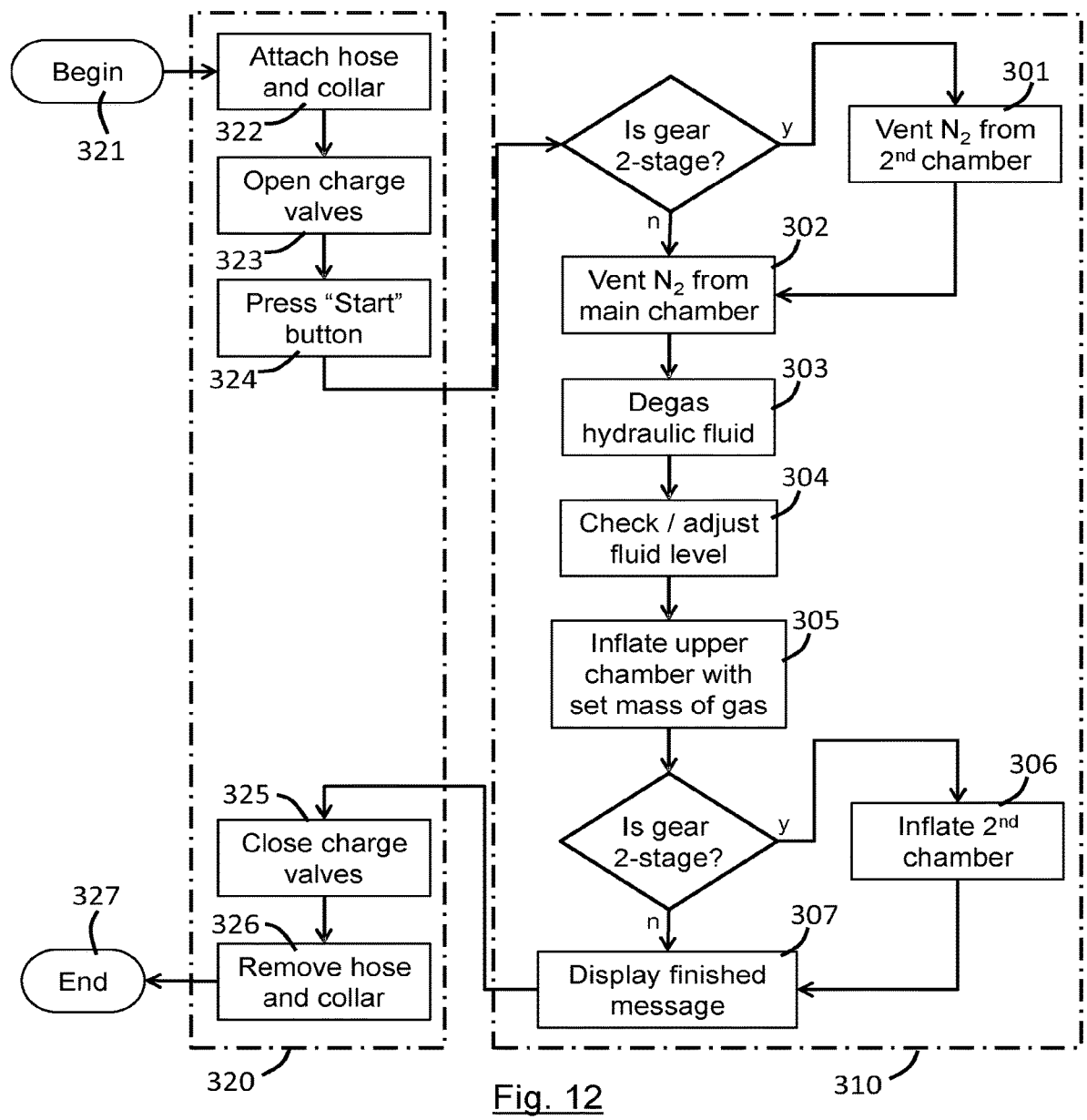

SERVICING OF LANDING GEAR SHOCK ABSORBERS

CROSS RELATED APPLICATIONS

The present application is a Divisional of U.S. patent application Ser. No. 15/204,548, filed Jul. 7, 2016, now allowed, which claims priority from Great Britain Application Number 1512144.5, filed Jul. 10, 2015, the entire contents of each of which are hereby incorporated by reference.

BACKGROUND OF THE INVENTION

The present invention concerns the servicing of aircraft landing gear shock absorbers. More particularly, but not exclusively, this invention concerns a method of servicing a shock absorber on a landing gear assembly of an aircraft, and an apparatus for servicing such a shock absorber. The invention also concerns an associated control unit for use in such a method or apparatus and an associated computer program product.

Aircraft landing gear assemblies typically include a shock absorber assembly (for example of the type referred to as an oleo strut) which provides suspension and shock absorbing functions for the aircraft during landing and take-off. An aircraft 101 including such shock absorber assemblies 102 is shown in FIG. 1. A single such shock absorber assembly 102 is shown in greater detail in FIG. 2 together with a schematic illustration of the wheels 109. (Parts of the landing gear including, for example, the axles for mounting the wheels and the upper part of the landing gear for receiving the oleo strut, have been omitted from FIG. 2 for the sake of clarity.) The shock absorber 102 comprises a piston 104 received within a cylinder 103, as is conventional with such shock absorbers. The cylinder 103 and piston 104 are connected via a torque link 107 for inhibiting rotation of the piston 104 relative to the cylinder 103, as is well known to those skilled in the art. The shock absorber 102 typically includes one or more gas springs (not shown separately in FIG. 2) with damping provided by hydraulic fluid (also not shown separately in FIG. 2). Over time, as the shock absorber 102 is used on successive landings and take-offs, a proportion of the gas and/or the hydraulic fluid escapes. It is important to ensure that the levels of both the gas and the hydraulic fluid are correct, as otherwise performance of the shock absorber may be adversely affected. Regular servicing of the shock absorber is thus required to ensure that the gas and fluid levels in the shock absorber are maintained at suitable levels.

Accurate determination of the levels of the gas and the hydraulic fluid is not however a straightforward process. The amount of gas in the shock absorber is typically measured by means of measuring the extension of the shock absorber relative to a reference point (often referred to as 'H-dimension') with the weight of the aircraft being supported by the landing gear assemblies of the aircraft. FIG. 3 shows an H-dimension (labelled as "h") as being measured between the bottom of the sliding cylinder 103 and the top of the attachment lug of the lower torque link 107 of the shock absorber 102. The temperature and pressure of the gas are then used to assess, using a look-up chart, whether the "H-dimension" indicates that there is an appropriate amount of gas in the shock absorber. The gas temperature thus needs to be measured. Often a sensor measures the gas pressure, which is of course proportional to the load supported by the shock absorber. Thus, according to a typical servicing procedure, the pressure and temperature are ascertained and the H-dimension of the shock absorber is measured; if, for that given pressure and temperature, the H-dimension is below a defined limit, then one of the following maintenance actions takes place:

1. Weight on wheels service: The shock absorber is inflated with gas (typically Nitrogen, $N_2$) to raise the H-dimension of the gear to above the limiting threshold.
2. Weight off wheels service: The aircraft is jacked and the shock absorber is depressurised. The shock absorber is redressed with hydraulic fluid and subsequently charged with $N_2$ to a specified pressure.

The use of the H-dimension to assess incorrect levels of gas and hydraulic can suffer from inaccuracies resulting from the friction between the moving parts of the shock absorber.

There are also disadvantages with both of the abovementioned procedures for servicing of landing gear shock absorbers. With a weight on wheels service, it is often assumed that the reduction in the H-dimension is the result of leakage of $N_2$ alone from the shock absorber. There are other reasons why the H-dimension might be lower than desired, including for example the loss of hydraulic fluid. Whilst some shock absorber designs permit weight on wheels servicing of both $N_2$ and hydraulic fluid, such a servicing process is in practice a complicated and demanding process for a maintenance engineer, and one which can increase the risk of the shock absorber being serviced with relatively low accuracy. The process may take one or two hours per shock absorber. A weight off wheels service on the other hand is more likely to result in an accurate and correct refilling of the shock absorber with the hydraulic fluid and gas. However, a weight off wheels service involves jacking-up of the aircraft and can take one or two days to complete. This is costly to the operator as the aircraft will be taken out of revenue service whilst the maintenance action is carried out. Thus, whilst a weight-on-wheels service is fast, the confidence of refilling/topping up the levels of hydraulic fluid and gas accurately to the correct level is not as great as the much slower and more costly weight-off wheels service. In both cases, the maintenance engineer may have to follow a large number of manual actions to complete the service. There is therefore an associated risk of human error resulting in an incorrectly serviced gear.

GB2514336 describes a method for carrying out a weight-on-wheels service of a landing gear shock absorber, in which the levels of damping fluid and gas are ascertained and then adjusted as required using various sensors and calculations. It is believed that further improvement is however possible.

SUMMARY OF THE INVENTION

The present invention provides, according to a first aspect, a method of servicing a shock absorber on a landing gear assembly of an aircraft, whilst the weight of the aircraft is at least partially supported by the landing gear assembly (i.e. whilst the aircraft is in a weight-on-wheels state). The method has application in relation to a shock absorber comprising at least one chamber containing both hydraulic fluid and a gas in fluid communication with each other. The method comprises a step of exhausting all gas from the chamber. The method comprises a step of degassing at least some dissolved gas from the hydraulic fluid. The method comprises a step of ensuring that one or more set criteria, which depend on the amount of hydraulic fluid in the chamber, are met. The method comprises a step of adjusting the amount of hydraulic fluid in the chamber, so that such criteria are met (for example topping up the hydraulic fluid if so required). The method comprises a step of delivering a pre-set mass of gas into the chamber of the shock absorber.

It will be understood that the hydraulic fluid is a liquid. Gas in the shock absorber may dissolve in the hydraulic fluid and/or be released from it at a rate dependent on various conditions, such as for example the temperature and pressure of the gas, the temperature of the liquid, the concentration of gas already in solution, the amount by which the hydraulic fluid has been agitated and the type of shock absorbing/suspension function the shock absorber has recently performed. For example, when an aircraft lands the pressure in the shock absorbers will increase rapidly to support the weight of the aircraft; in chambers where gas and hydraulic fluid are unseparated, gas will be absorbed into the hydraulic fluid. This process can be accelerated by vigorous mixing of the fluid during the landing event and subsequent taxiing period. Nitrogen absorbed in hydraulic fluid when the gas in the shock absorber is under pressure (for example as is typically the case in a weight on wheels state) may be released when the weight is off the wheels, for example after take-off. Thus during flight the mass of gas (the gas not contained within the hydraulic fluid) in the shock absorber may increase as dissolved gas degasses from the hydraulic fluid. Taking into account the pressure, temperature, and volume of the gas (not contained within the hydraulic fluid), in the weight on wheels state, without considering the amount of gas contained within the hydraulic fluid (whether dissolved, suspended as bubbles of gas in the liquid, or otherwise contained) will not provide a very accurate determination of the sum total of mass of gas within the shock absorber and could provide underestimates of the amount of gas that is contained in the shock absorber and therefore underestimates of the pressure of the gas that will be in the gaseous state for a given temperature and volume in the shock absorber immediately before landing. It will be appreciated that the degassing of at least some dissolved gas from the hydraulic fluid may include releasing gas by means of desorption so that some gas comes out of solution and/or may include releasing gas bubbles from within the hydraulic fluid by means of such bubbles releasing their gas from within the body of liquid to outside the body of liquid.

In an embodiment of the invention, the level of hydraulic fluid in the shock absorber is measured only once gas held in solution in the hydraulic fluid is released so that the volume of fluid as measured is closer to a true representation of the amount of hydraulic fluid in the shock absorber and is not artificially higher as a result of dissolved gas or gas bubbles in the fluid. Also, if the amount of gas held in the fluid is lower than it would otherwise be, it is safer to assume that no significant mass of gas will degas when the shock absorber extends once the weight is off the wheels (for example, when in flight). It can therefore be more justifiably assumed that the amount of gas introduced into the shock absorber will represent the amount of gas that is in the shock absorber in the gaseous state immediately before landing. In certain methods of the prior art, a less than expected H-dimension would be interpreted only as a lack of gas, leading to the replacement of lost hydraulic fluid and/or absorbed gas with additional gas, most probably leading to inaccurate servicing of the shock absorber. Also, in such prior art methods, if adding more gas whilst the shock absorber is under pressure (in a weight on wheels configuration for example) no account would be taken of the absorption of gas during the pressurisation process, also leading to greater potential inaccuracies. In certain embodiments of the invention, it is no longer necessary to measure the H-dimension when maintaining/servicing a shock absorber.

The shock absorber may be the principal shock absorber of the landing gear assembly. For example, the landing gear assembly may comprise a strut member for carrying the majority of the load to be carried by the landing gear assembly when the aircraft is in the weight-on-wheels state. The shock absorber may be in the form of an oleo strut. The shock absorber may be in the form of a single-stage shock absorber. Such a single-stage shock absorber may comprise a single chamber within which both the gas and hydraulic fluid are accommodated. The shock absorber may be in the form of a multiple-stage shock absorber. Such a multiple-stage shock absorber may comprise multiple chambers within which gas and/or hydraulic fluid are accommodated. For example there may be a first chamber containing gas and hydraulic fluid with the gas being at a lower pressure when the aircraft is in the weight-off-wheels state and a second chamber containing gas (but possibly not hydraulic fluid) with the gas being at a higher pressure when the aircraft is in the weight-off-wheels state. Such multiple chambers are typically provided in series so that the higher pressure stage contributes most to the suspension of the aircraft under high loading. It may be that said at least one chamber comprises two or more separately discernible compartments which are in fluid communication with each other.

The shock absorber may be one of multiple shock absorbers associated with the same single landing gear assembly. For example, the landing gear assembly may comprise twin struts, arranged in a parallel configuration, each strut comprising a separate shock absorber according to the present invention.

The shock absorber may comprise multiple chambers. The chambers may be separate from each other; that is, not in fluid communication with each other. The shock absorber may be part of a landing gear strut. The shock absorber may be in the form of a multiple-stage, for example a two-stage, shock absorber.

It will be understood that the step of exhausting all gas from the chamber means exhausting substantially all of the gas which is not at that time dissolved or otherwise contained within the hydraulic fluid. It will also be understood that, in certain embodiments, there may remain one or more empty spaces in the chamber not occupied by the fluid. If one or more such spaces exist, there will inevitably be some gas contained in the space, because a perfect vacuum will not be formed. It will however be the case that any gas remaining outside of the hydraulic fluid but within the space, after the step of exhausting all gas from the chamber has been completed, will as a practical matter be negligible. The space left will be at a pressure significantly lower than atmospheric pressure.

The shock absorber will typically (i.e. but not necessarily) be arranged such that it is a generally elongate structure, typically aligned with the direction of loading. The shock absorber will typically be arranged such that its length changes between an extended (e.g. weight-off-wheels) configuration and a contracted (e.g. typically weight-on wheels) configuration.

The step of exhausting all gas from the chamber might, depending on the design of the landing gear assembly and unless other steps are taken, mean that the shock absorber closes such that it moves in a direction from an extended configuration to a contracted configuration. The chamber may reduce in volume as the shock absorber closes such that it moves in a direction from an extended configuration to a contracted configuration.

It will typically be the case that during the step of exhausting all gas from the chamber, the volume of the chamber reduces so that the shock absorber contracts. The method may further include a step of using a stop (for example in the form of a collar) which is arranged to resist further contraction of the shock absorber. The stop may in use bear at least some of the load that would otherwise be sustained by the shock absorber.

It may be that a collar is arranged around the landing gear assembly, the collar bearing at least some of the load that would otherwise be sustained by the shock absorber. The collar may thus perform the function of a stop. The collar may assist in the supporting, at least in part, of the weight of the aircraft. The step of arranging such a stop, or collar, may be conducted before the step of exhausting all gas from the chamber is completed. The step of arranging such a stop, or collar, may be conducted before the step of exhausting the gas from the chamber is started. The collar may extend more than 180 degrees around the shock absorber.

There may be one or more such stops. It may be that substantially all of the vertical load that is sustained by the landing gear assembly is transmitted via said one or more such stops. The one or more such stops may be removable parts. The servicing method may therefore include a step of removing the stop from the aircraft (i.e. the stop is removed before the aircraft commences either taxiing manoeuvres or take-off). As mentioned above, the stop may be in the form of a collar.

Using a stop, such as a collar for example, which allows the aircraft to be maintained in a weight-on-wheels state allows emptying of the shock absorber under lower pressures. Existing aircraft have valves which allow gas to be expelled with weight on wheels but do not permit removal of hydraulic fluid, except under pressure and in the context of adding new fluid whilst existing fluid is removed (i.e. flushing through). Flushing-through hydraulic fluid is an inefficient process.

The step of degassing at least some dissolved gas from the hydraulic fluid may include a step of actively lowering the pressure within the chamber, for example by applying a partial vacuum. A vacuum pump may be used. The step of exhausting all of the gas may include a step of actively lowering the pressure within the chamber. A vacuum pump may be used both to exhaust gas from the chamber and to degas dissolved gas from the hydraulic fluid at the same time. It will be appreciated that in some embodiments, the steps of degassing dissolved gas and of exhausting gas from the chamber may be performed simultaneously, at least partially (one step beginning before the other finishes).

It may be that the step of exhausting all of the gas includes releasing at least some, and possibly all of, the exhausted gas to atmosphere. It may be that the step of exhausting all of the gas includes capturing at least some of gas so exhausted, for example in a tank.

The step of exhausting all of the gas from the chamber may include using a fluid line along which gas flows in one direction. The step of delivering the pre-set mass of gas into the chamber may include using the same fluid line but with the gas flowing in the opposite direction. It may be that the fluid line remains connected (and is therefore not disconnected) between the step of exhausting all of the gas from the chamber and the step of delivering the pre-set mass of gas into the chamber.

It may be that the step of degassing at least some dissolved gas from the hydraulic fluid includes a step of releasing and capturing at least some of the gas.

It may be that the step of delivering a pre-set mass of gas into the chamber includes delivering gas from a variable volume tank. It may be that the volume, pressure and temperature of the gas inside the variable-volume tank are each ascertained so that the mass of gas in the tank can be calculated. The method may include using measures of the volume, pressure and temperature of the gas inside the tank at at least two different times as the volume of the tank reduces in order to ascertain the mass of gas delivered from the tank (e.g. in order to correctly deliver the correct mass of gas). It may for example be the case that the mass of gas in the tank is ascertained, that the mass to be delivered to the shock absorber is subtracted from the mass of gas in the tank to provide a target value, and that the gas in the tank is then gradually (e.g. continuously and progressively) delivered to the shock absorber until such time as the mass of gas left in the tank is equal to the target value. The pressure, volume and temperature of the gas in the tank, as gas is being delivered to the chamber of the shock absorber, is ascertained many times during the process such that the moment at which the target value is reached can be accurately ascertained. An actuator may be controllable to adjust the volume of the tank so as to force gas out of the tank into the chamber. The actuator may be hydraulically powered. It may be that the gas in the tank is effectively injected into the chamber by such an actuator. The volume of the variable volume tank may reduce by more than half, and possibly more than 75%, when delivering gas to the chamber. It may be that the volume of the variable volume tank is reduced by more than 99%, so that the volume of the tank is close to zero when the chamber has been filled with the pre-set mass of gas. In such a case, the tank may be filled (before the step of delivering the pre-set mass of gas into the chamber) from a gas source so that the amount of gas in the tank is equal to the pre-set mass. Thus, there may be a first measurement (at a first time) of the volume, pressure and temperature of the gas inside the tank which relates to a mass that is equal to the pre-set mass, so that the second measure (at the second time) is simply determining when the volume of the tank is reduced to zero. It may be that the step of delivering a pre-set mass of gas into the chamber includes measuring out one or more known masses of gas and delivering said one or more known masses of gas, successively, into the chamber. It may be that a single pre-set mass of gas is created, per separate chamber of the shock absorber, and that the single pre-set mass is then injected into the respective shock absorber chamber.

The step of delivering a pre-set mass of gas into the chamber may include delivering the pre-set mass via a regulator that is configured to measure or regulate the rate of injection of mass of gas per unit time. There may be a control unit which monitors the sum total of mass of gas so delivered over time and stops the delivery of gas once the pre-set mass of gas to be delivered is reached. If the rate of mass flow is precisely known then it may be possible to deliver the pre-set mass of gas into the chamber by means of delivering gas at the known rate for a pre-set period of time.

It may be that the step of ensuring said one or more set criteria depending on the amount of hydraulic fluid in the chamber are met comprises testing whether the hydraulic fluid is at a given level (e.g. a given volume) and, if not, adjusting the level accordingly. In the case where a collar is arranged around the landing gear assembly, the collar may set a predetermined level of hydraulic fluid, as a result of fixing a fixed extension of the length of the shock absorber. The level of hydraulic fluid may be set by an outlet of the shock absorber from which fluid may be expelled moving relative to the level of the fluid as the length of the shock absorber contracts, the outlet thus being positioned in a known fixed position when the further contraction of the length of the shock absorber is stopped by the collar.

It may be that the steps of the method are performed automatically. The method may for example be in the form of a semi-automated method of servicing the shock absorber. There may for example be manual steps in addition to automated steps. There may be a manual step of making a connection, for example with a hose or the like, between a part of automated servicing equipment and a part of the shock absorber. There may be a manual step simply of providing, for example transporting to the aircraft, apparatus suitable for performing the steps of the method of the present invention. Two or more, preferably all, of the following steps are automated:

exhausting all gas from the chamber,
degassing at least some dissolved gas from the hydraulic fluid,
ensuring that one or more set criteria, which depend on the amount of hydraulic fluid in the chamber are met, including if so required adjusting the amount of hydraulic fluid in the chamber
delivering a pre-set mass of gas into the chamber.

It may be that each such step is automated in the sense that a piece of apparatus (preferably the same set of equipment) performs the step. It may be that the steps are automated in the sense that the steps are automatically conducted one after the other.

The apparatus used in performing the method may comprise a source of gas, a source of hydraulic fluid, and a gas delivery system. The apparatus may be in the form of the apparatus according to any aspect of the present invention as claimed or described herein, including any optional features relating thereto.

The method may include the use of a control unit. The control unit may be configured to control processes effected by the method including one or more of the step of exhausting gas from the chamber, the step of degassing dissolved gas from the hydraulic fluid, the step of ensuring that said set criteria are met, and the step of delivering a pre-set mass of gas into the chamber. It may be that all such steps are monitored, effected or otherwise controlled by the control unit. It may be that, during at least one of the steps of the method, for example the step of delivering a pre-set mass of gas into the chamber, the control unit monitors one or more inputs, for example including one or more inputs concerning temperature and pressure measurements from appropriate sensors, for conditions suggestive of a fault. If such a fault is suspected by the control unit, an electronic fault-detected flag may be set by the control unit, or some other indication be provided, that can be used to alert maintenance engineers of the likely fault. The control unit on detecting a suspected fault may cease carrying out one or more steps of the method and may, for example, stop delivering gas into the chamber. The conditions suggestive of a fault may for example be that the measured temperature and/or pressure is outside an expected range.

There may be a single control unit that performs all functions referred to above as being under the control of a control unit. Multiple control units, or computer processors, may be provided.

The present invention also provides an apparatus for performing a method of servicing a shock absorber on a landing gear assembly of an aircraft, whilst the weight of the aircraft is at least partially supported by the landing gear assembly. The apparatus may be configured for performing a method according to any aspect of the present invention as claimed or described herein, including any optional features relating thereto.

There may be provided a, preferably portable, apparatus for servicing a shock absorber on a landing gear assembly of an aircraft when the aircraft is in a weight on wheels configuration, the shock absorber comprising at least one chamber containing both hydraulic fluid and a gas in fluid communication with each other. Such an apparatus may comprise a source of gas, a source of hydraulic fluid, and a gas delivery system for delivering a pre-set mass of gas into the shock absorber.

It will be understood that the pre-set mass of gas may be predetermined to be all of the gas that is to be contained in said at least one chamber during operation of the aircraft. The pre-set mass of gas may for example be a fixed mass of gas that is representative of the sum amount of gas that should be contained in the said at least one chamber of the shock absorber after a correct service. It is the mass that is pre-determined, not the volume of gas supplied or the pressure to which the shock absorber is filled with gas.

It may be that the apparatus has two parts, namely a first part for exhausting gas from the chamber and a second part for delivering the pre-set mass of gas into the shock absorber. The first and second parts may share components. It may be that the first part is substantially separate from the second part.

The apparatus may further comprise a vacuum pump for exhausting gas from said at least one chamber.

The apparatus may include a fluid trap for collecting hydraulic fluid that may flow out of the chamber as the gas is exhausted.

The apparatus may further comprise a pump for delivering hydraulic fluid to the shock absorber from the reservoir.

The apparatus may be provided on a single servicing cart. Such a servicing cart may be arranged to transport all of the parts of the apparatus to and from an aircraft in a weight on wheels state.

The apparatus may include one or more collars, each collar being arranged to stop contraction of a particular type of shock absorber and being able to sustain the compressive loads of the same magnitude as those sustained by the shock absorber in the weight-on-wheels state.

It may be that the apparatus includes a gas port connector, for example a quick-connector, for connecting to a gas port connector of the shock absorber, via a hose for example. The apparatus may include a control unit. The control unit may be configured to control delivery by the gas delivery system of the pre-set mass of gas into the shock absorber. The control unit may be configured to control receiving of gas into the tank. The control unit may be configured to control exhausting of gas from the chamber. The control unit may be configured to control degassing of dissolved gas from the hydraulic fluid in the chamber. The control unit may be configured to control deciding whether to adjust the amount of hydraulic fluid in the chamber. The control unit may be configured to control adjusting the amount of hydraulic fluid in the chamber if necessary. The control unit may be configured to control adding an amount of hydraulic fluid so that a target level of fluid in the chamber is obtained.

The control unit may be configured to control all such things.

It may be that the gas delivery system for delivering a pre-set mass of gas into the shock absorber comprises a regulator that is configured to measure or regulate the rate of delivery of mass of gas per unit time.

The gas delivery system may be controlled by a control unit that monitors the mass per unit time of gas flowing into the shock absorber, and from such information tracks the mass of gas delivered to the chamber. The control unit may determine when the sum mass of gas delivered to the chamber has reached the target mass. The gas delivery system may measure the mass flow rate by using an orifice flow meter. Such an orifice flow meter may create a choked flow. The orifice flow meter may utilise an orifice plate. The gas delivery system may measure the mass flow rate by creating a choked flow, with means other than an orifice, for example by means of a restriction provided by a nozzle. The control unit may use at least three, and preferably all, of the following four measurements in order to calculate the mass flow rate: temperature of gas upstream of choked flow region, pressure of gas upstream of choked flow region, temperature of gas downstream of choked flow region, and pressure of gas downstream of choked flow region. It may be necessary to calibrate the set-up used to calculate the mass flow rate; or is may be that appropriate scaling factors can be calculated in advance.

It will be understood that the pre-set mass of gas may be predetermined to be all of the gas that is to be contained in said at least one chamber during operation of the aircraft.

It may be that the apparatus has two parts, namely a first part for exhausting gas from the chamber and a second part for delivering the pre-set mass of gas into the shock absorber. The first and second parts may share components. It may be that the first part is substantially separate from the second part.

The apparatus may include a tank which captures gas exhausted from the chamber. The apparatus may include a tank which delivers gas to the chamber. The same tank may be used to both capture gas exhausted from the chamber and deliver gas to the chamber. The tank may have a variable volume. There may be an actuator arranged to effect a change in that volume. The operation of the actuator may be effected under control of the control unit. The control unit may be configured to control the receiving of gas into the tank (including for example gas exhausted by the shock absorber and/or the gas received from the source of gas). The volume of the tank may be ascertained from position sensor.

A control unit may be provided which is configured, in dependence on a received indication of a pre-set mass of gas, to operate the gas delivery system so that it delivers the pre-set mass of gas into the shock absorber. The received indication of a pre-set mass of gas may be ascertained by the control unit by means of a look up table. The control unit may be configured to receive an input from an input device that reads data associated with the shock absorber in order to ascertain, from a look-up table, the pre-set mass of gas to be delivered into the shock absorber. The data read by the input device may for example be an identification code, for example provided by a bar-code, RFID tag or the like, which identifies the type of shock absorber. The same control unit may be used to control the exhaust of gas from the chamber as is used to control the supply of gas to the chamber.

The present invention also provides a control unit configured to perform the function of the control unit of the method or apparatus according to any aspect of the present invention as claimed or described herein, including any optional features relating thereto. The control unit may comprise a programmable control unit programmed with appropriate software. The present invention also provides a computer program product configured to cause, when the computer program is executed, a programmable control unit to form a control unit according to any aspect of the present invention as claimed or described herein, including any optional features relating thereto.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 12 is a flow-chart illustrating an example servicing process carried out in accordance with the second embodiment of the invention.

DETAILED DESCRIPTION

Figure 1:
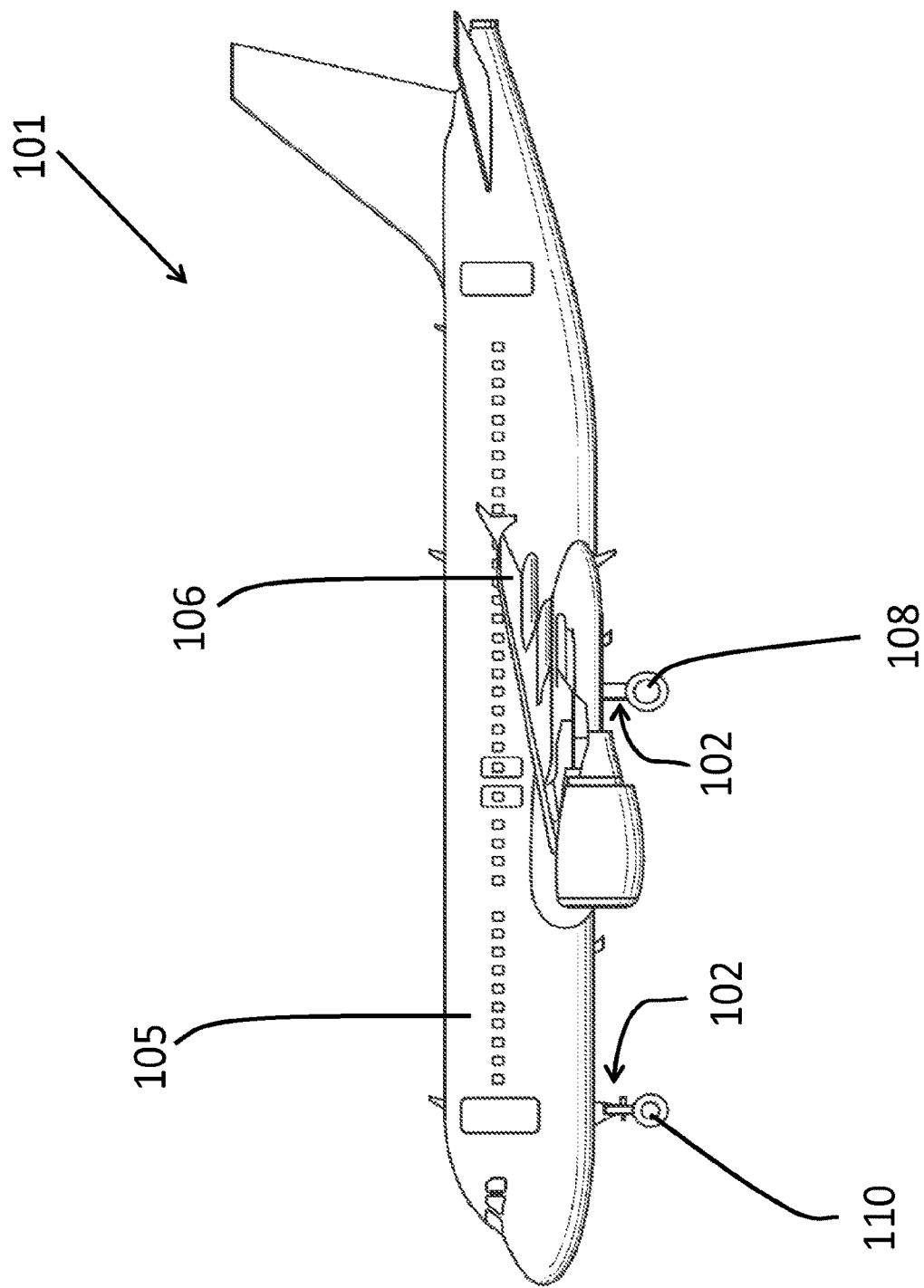
FIG. 1 shows an aircraft of a type that can be serviced by a servicing cart of either the first or second embodiment of the invention.
Figure 2:
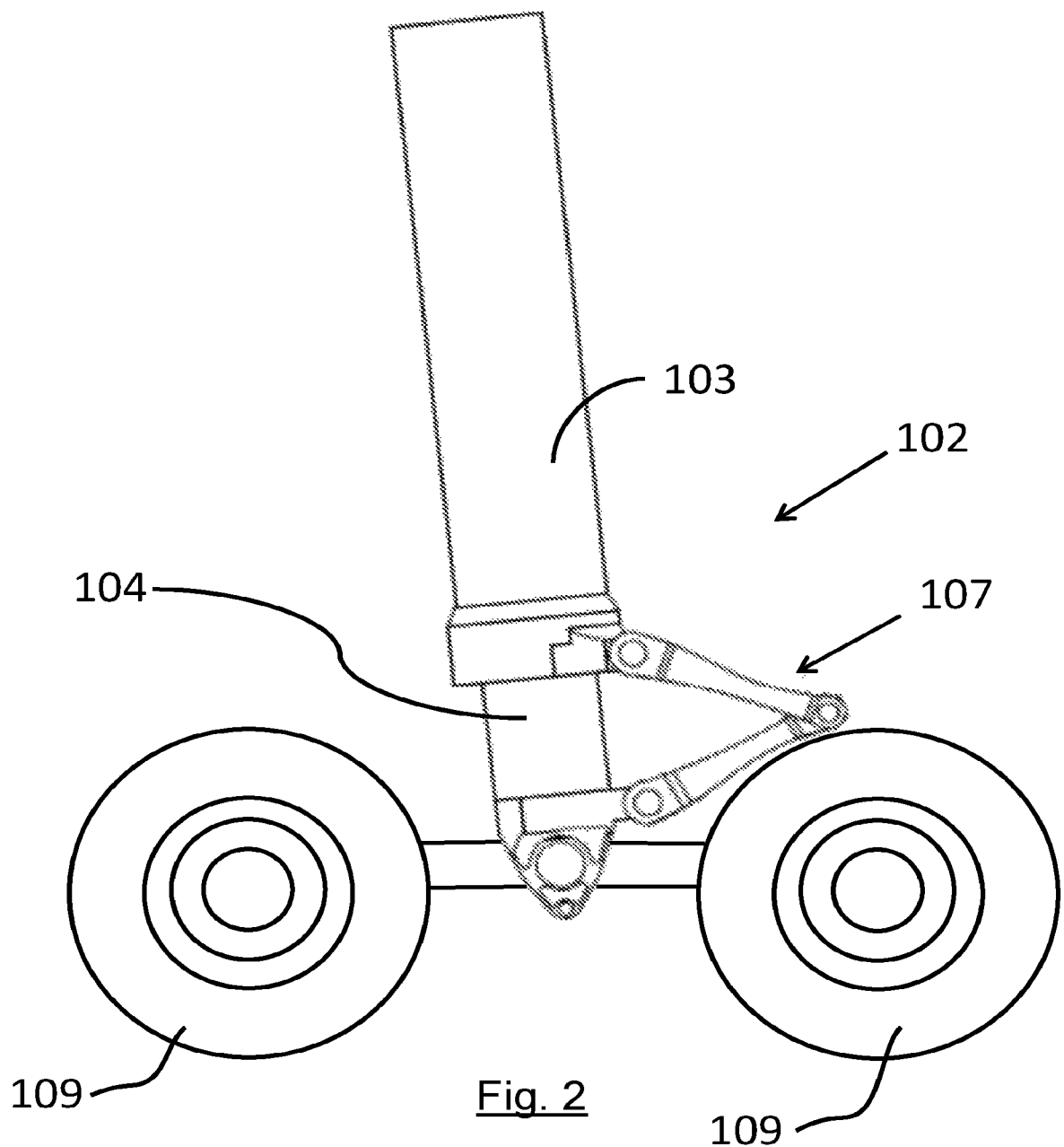
FIG. 2 shows a shock absorber of the aircraft of FIG. 1.
Figure 3:
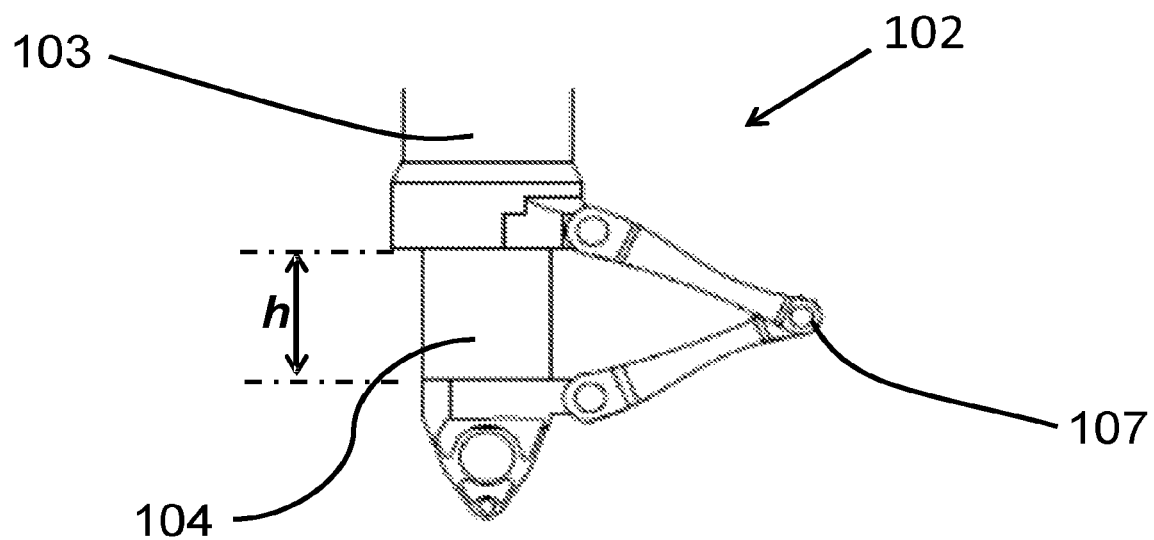
FIG. 3 shows part of the shock absorber of FIG. 2 illustrating the measuring of an H-dimension.
Figure 4:
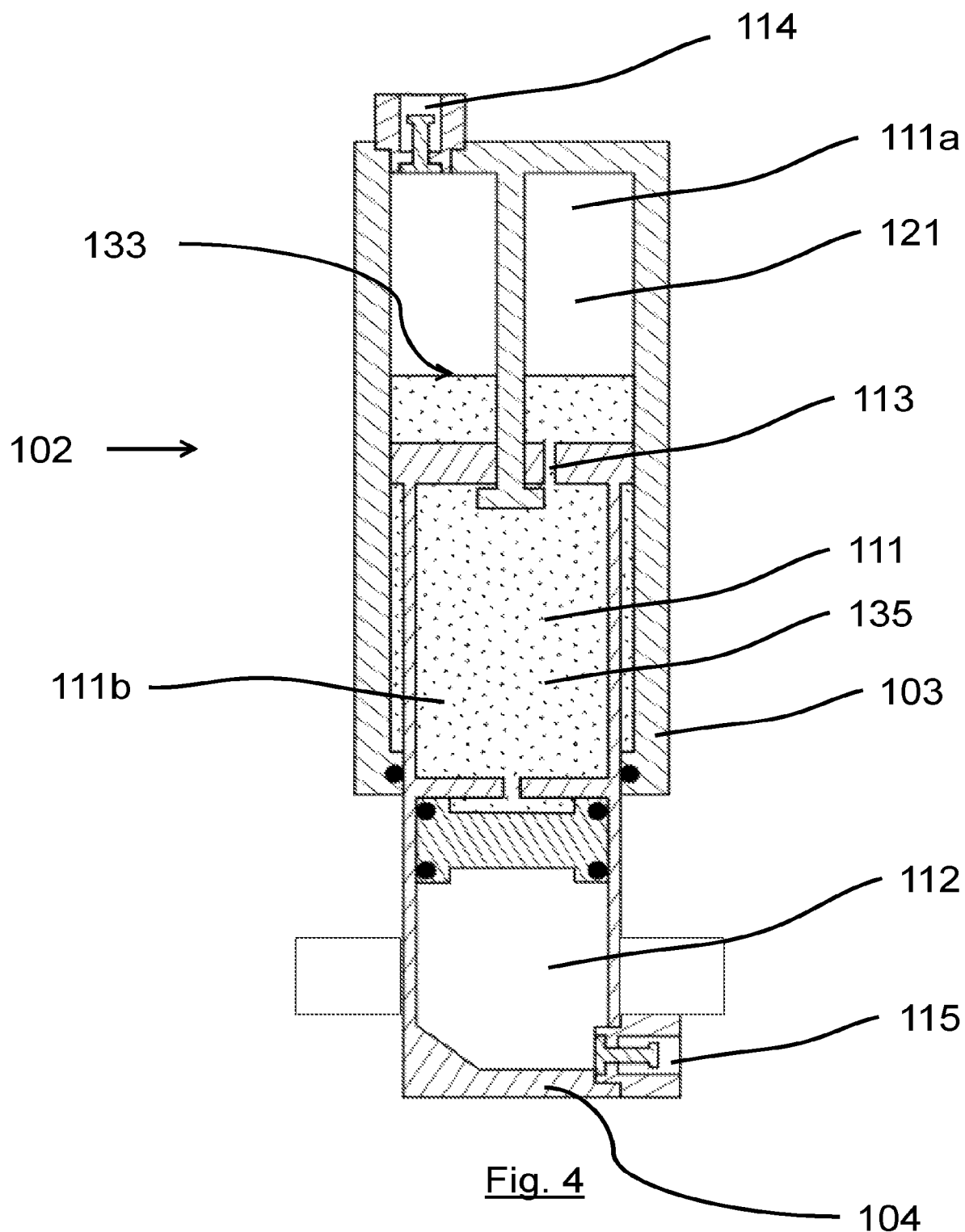
FIG. 4 shows a two-stage shock absorber of a type that can be serviced by a servicing cart of either the first or second embodiment of the invention.

FIGS. 1 and 2 show an aircraft landing gear of a type suitable for use with all of the illustrated embodiments of the present invention. Thus, there is shown in FIG. 1 an aircraft 101 comprising a pair of wings 106 and a fuselage 105. The wings each carry an engine. The aircraft is supported on the ground by sets of landing gear assemblies comprising a main landing gear (MLG) 108 and a nose landing gear (NLG) 110. Each landing gear assembly is provided with suspension and shock absorption functions, by means of a shock absorber assembly 102. The shock absorber 102 is of a type where hydraulic fluid is in contact with Nitrogen gas ($N_2$), such that $N_2$ may be absorbed by the fluid. A schematic illustration of such a shock absorber 102 is shown in FIG. 4. Thus, there is shown a shock absorber 102 having a lower part (piston 104) arranged to slide within an upper (cylinder 103) so that the shock absorber 102 is telescopic. There is a first upper chamber 111 in which hydraulic fluid 135 and $N_2$ 121 are in fluid communication with each other, so that there is at least one surface 133 of contact between the fluid 135 and gas 121. The upper chamber 111 is split into two separate compartments 111a, 111b divided by a restrictive opening 113 arranged to provide resistance for fluid flow between the compartments 111a, 111b. There is also a second lower chamber 112 containing gas but no hydraulic fluid. The shock absorber 102 is thus in the form of a two-stage shock absorber.

The gas in the upper chamber 111 acts as a gas spring thus providing part of the suspension function of the shock absorber 102. Damping is provided as a result of the hydraulic fluid being forced through the restrictive opening 113 as the piston 104 slides within the cylinder 103. The gas in the lower chamber 112 acts as a secondary gas spring which is of greater significance under relatively high loading. The pressure in the lower chamber 112 is arranged to be significantly higher than in the upper chamber 111 under low loading, so that the lower chamber 112 only undergoes significant contraction when the pressure of the gas in the upper chamber 111 equals that in the lower chamber 112. There is a lower charging valve 115 associated with the lower chamber 112. There is an upper charging valve 114 associated with the upper chamber 111.

Figure 5A:
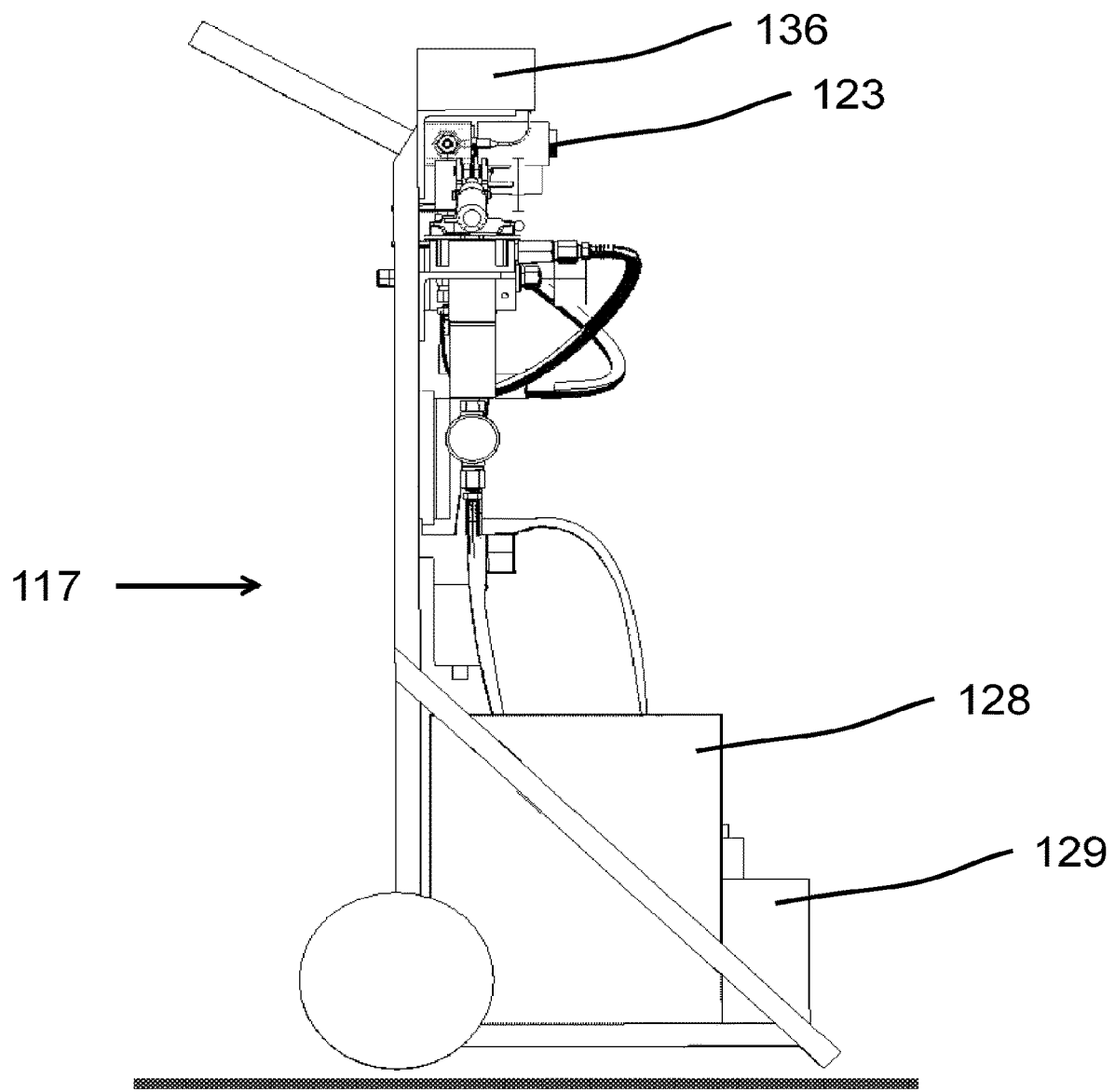
FIGS. 5a and 5b show a lightweight portable servicing cart according to a first embodiment of the invention.
Figure 5B:
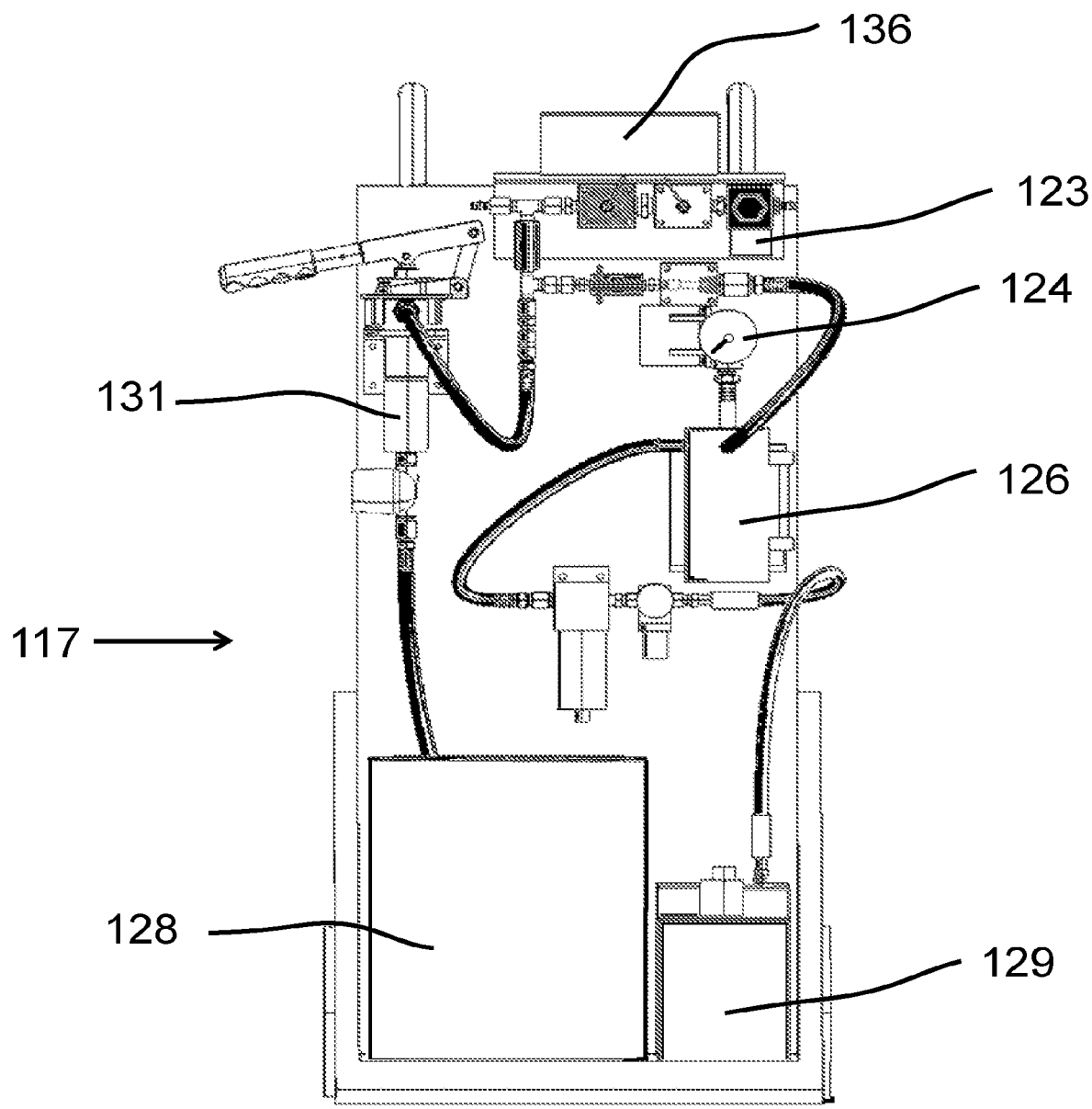

The first embodiment of the present invention concerns servicing of an aircraft landing gear shock absorber 102 with the use of a lightweight portable servicing cart 117. The cart 117 is shown in FIGS. 5a and 5b and comprises two primary parts, a deflation kit 118 (see FIG. 6) and an inflation kit 119 (see FIG. 7). The main components of the deflation kit 118 (referred to below as the Deflation and Oil Replenishment Tool or "DORT") are a vacuum pump 129, a hydraulic fluid trap 126 and a source 128 of hydraulic fluid. The main components of the inflation kit are pressurised canisters of $N_2$ 120 (supplied separately from the cart 117 shown in FIGS. 5a and 5b), and a gas delivery system including a control unit 136.

Figure 6:
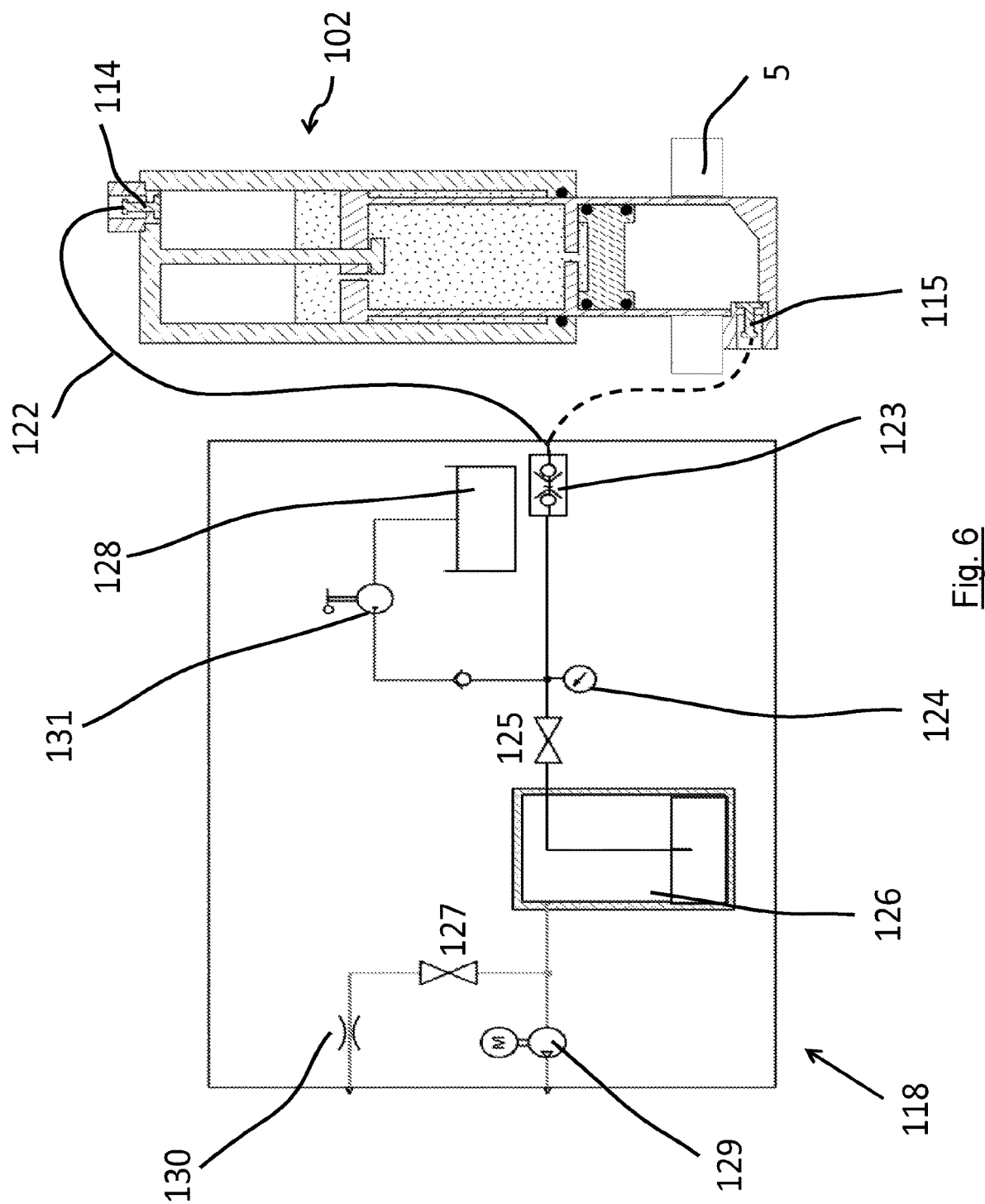
FIG. 6 shows schematically a first part of the servicing cart of FIGS. 5a and 5b in use.

FIG. 6 shows the "DORT" deflation kit 118 attached to a shock absorber 102. There is included a quick release coupling 123 for connection to the shock absorber 102 via a hose 122. A gas vent 130 is connected via valves 125 and 127 and a fluid trap 126 to quick release coupling 123. Also connected to the quick release coupling 123 via the fluid trap 126 and valve 125, is a vacuum pump 129. A pressure gauge 124 is provided between the quick release coupling 123 and valve 125. A hydraulic fluid reservoir 128 and associated fluid pump 131 are also connected to the quick release coupling 123.

Figure 7:
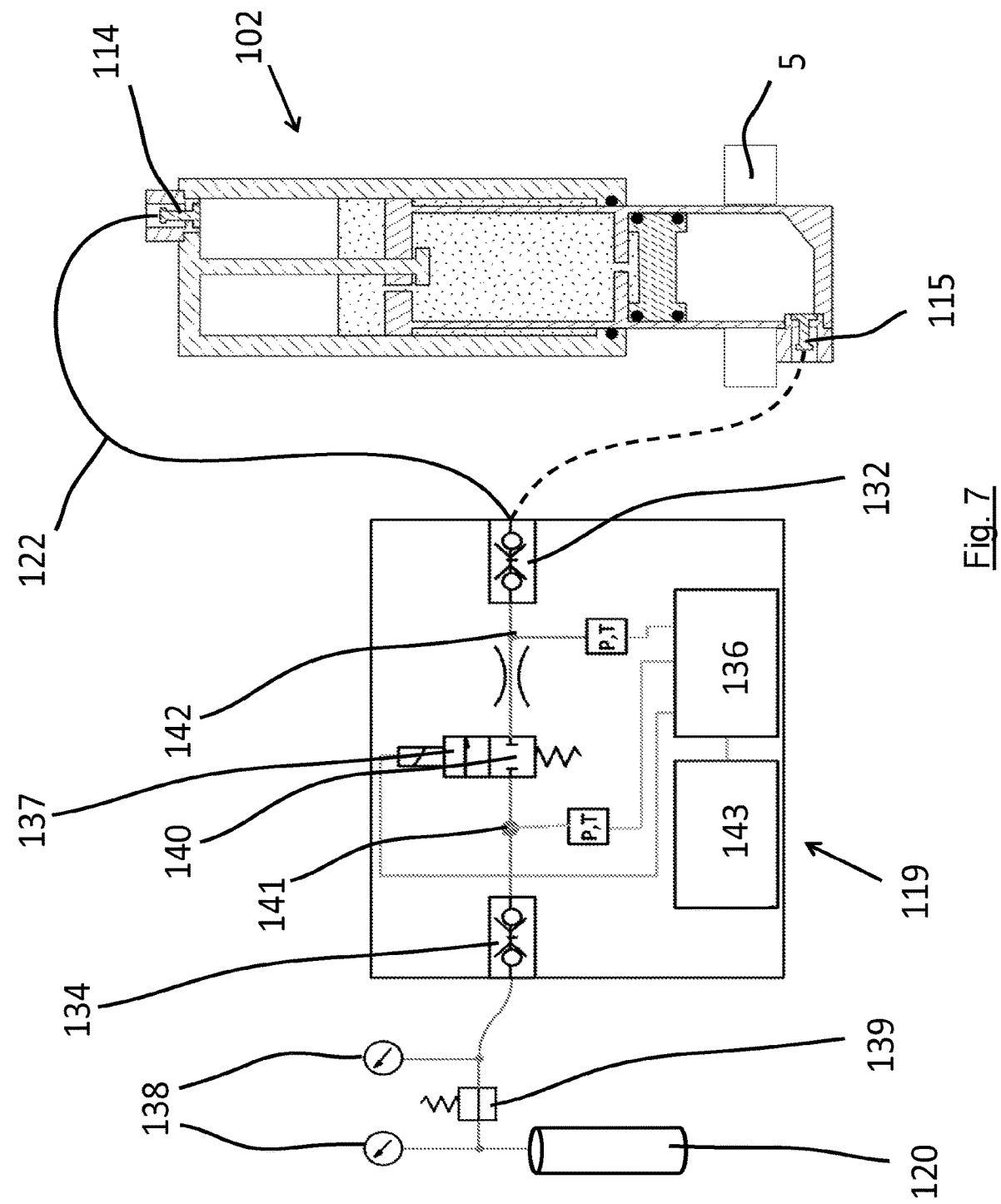
FIG. 7 shows a second part of the servicing cart of FIGS. 5a and 5b in use.

FIG. 7 shows the inflation kit 119 attached to a shock absorber 102. There is included a quick release coupling 132 for connection to the shock absorber 102 via a hose 122. A further quick release coupling 134 is provided as a gas inlet to allow for connection to a gas cylinder 120. The gas inlet is connected via a gas flow regulator 137 to the quick release coupling 132 which acts therefore as a gas outlet, in use. The regulator 137 comprises a solenoid valve (not shown) and an orifice 140, or other nozzle, so shaped as to create a choked flow of gas in use. The regulator 137 also comprises an upstream pressure and temperature sensor set 141 provided upstream of the orifice 140 and a further, downstream, pressure and temperature sensor set 142 provided downstream of the orifice 140. The sensor sets are connected to a control unit 136 which is, from the sensor readings, arranged to calculate the mass of gas flowing through the orifice 140 per unit time. This can be achieved by means of pre-calibrating the gas flow regulator 137.

The gas inlet coupling 134 is shown connected to a gas cylinder 120 via the cylinder's gas regulation valve 139. Before and after the cylinder's gas regulation valve 139 are provided pressure gauges 138.

Figure 8:
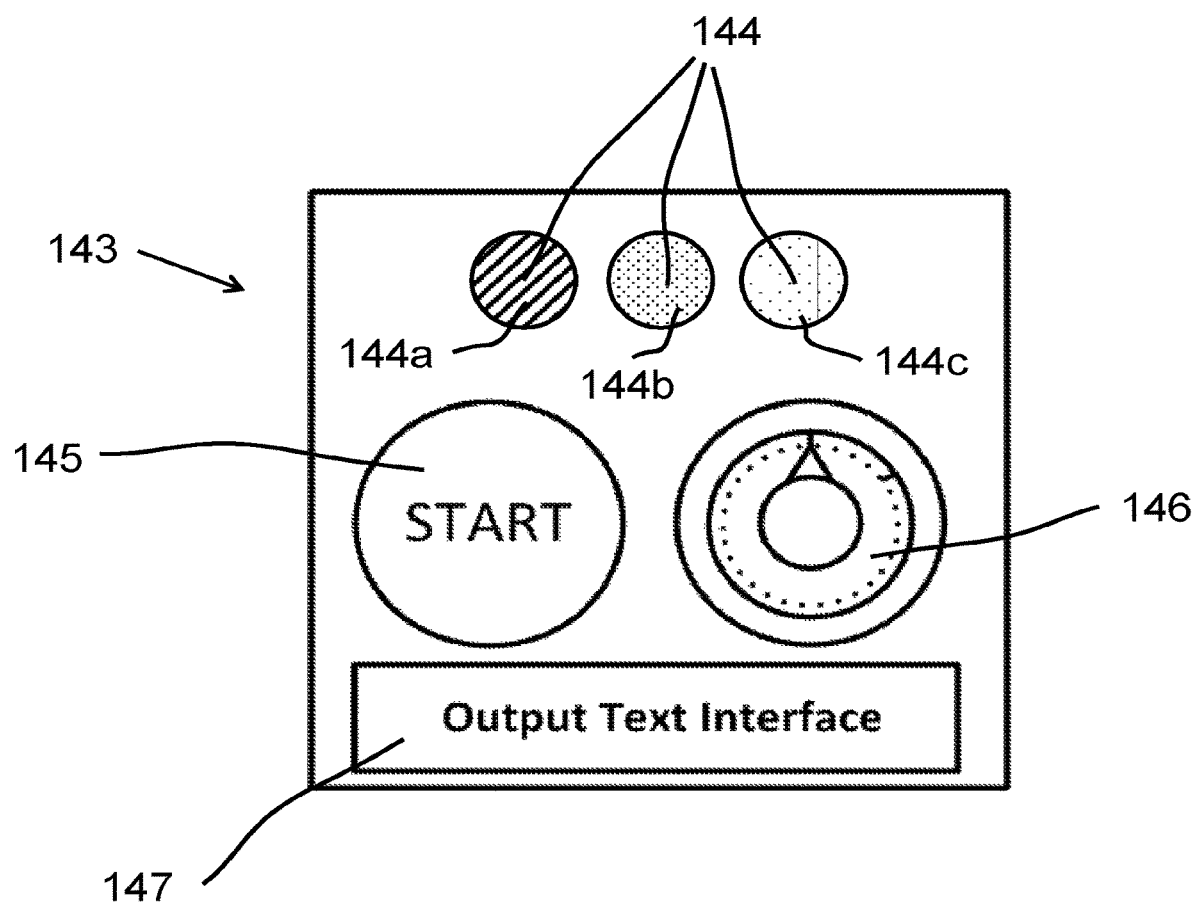
FIG. 8 shows an interface unit of the second part shown in FIG. 7.

The control unit 136 is connected to an interface unit 143 to allow operator interaction. FIG. 8 shows the interface unit 143 in greater detail. Three light indicators 144 are provided: a green light 144a to indicate a "ready" state, an amber light 144b to indicate an "in progress" state, and a red light 144c to indicate a "fault" state. There is also provided a large "Start" press button 145, a user input selector dial 146, and a text message display screen 147. The control unit 136 comprises a computer processor, which is programmed with computer software held in memory readable by the computer processor and which, when executed, cause the control unit 136 to function as required by the present embodiment. There is also data held in memory accessible by the control unit 136, such data representing the masses of gas that are required for different given types of landing gear shock absorbers for example.

A method of servicing a shock absorber 102 using the portable servicing cart 117 of the first embodiment will now be described.

As a first part of the process, deflation of the shock absorber 102 with the aircraft 101 in the weight on wheels state is conducted. In particular, the upper chamber 111 in which gas 121 and hydraulic fluid 135 are not separated is exhausted of all gas in the gaseous state, and further gas is then allowed to degas from the hydraulic fluid, which is then topped up as necessary. This is achieved (after the aircraft parking brake has been applied and chocks have been installed to prevent movement) by conducting, in order, the steps set out below.

Figure 9:
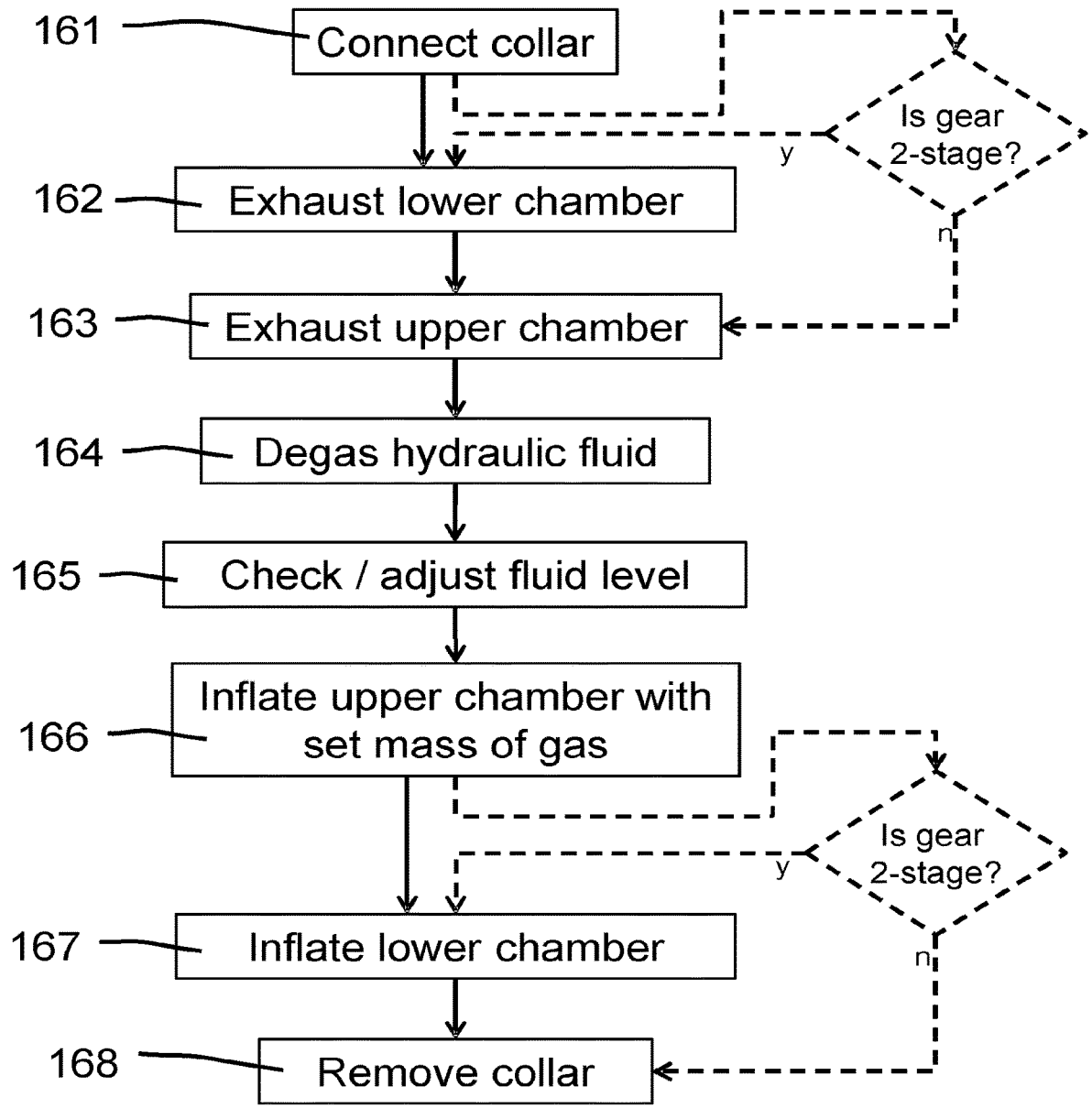
FIG. 9 is a flow-chart illustrating an example servicing process carried out in accordance with the first embodiment of the invention.

It will be appreciated that the process of the first embodiment is described with reference to a 2-stage shock absorber 102. The same equipment and process steps are able to be used for servicing a single-stage shock absorber. If the shock absorber is single-stage steps 2 to 4 and 17 to 19 are to be omitted, as indicated in FIG. 9 by means of the steps shown in broken line. The steps conducted are as follows:

Connect Collar (See Box 161 of FIG. 9)

Step 1—If required, install service collar (shown in FIGS. 6 and 7 as item 5) on the lower piston 104.

Exhaust Lower Chamber 112 (See Box 162 of FIG. 9), if Gear is Two-Stage

Step 2—Connect the Deflation and Oil Replenishment Tool ("DORT") 118 via quick release coupling 123 to the lower charging valve 115 via high pressure flexible hose 122.

Step 3—Open valves 115, 125 & 127 and vent the lower stage onto the service collar. The gear will descend during this process.

Step 4—Disconnect the hose 122 from charging valve 115.

Exhaust Upper Chamber 111 (See Box 163 of FIG. 9)

Step 5—Connect the Deflation and Oil Replenishment Tool ("DORT") 118 via quick release coupling 123 to the upper charging valve 114.

Step 6—Open upper charging valve 114 and let the upper stage $N_2$ discharge via valves 125, 127 and venting orifice 130. The gear will again descend during this process. Any hydraulic fluid that is carried with the gas, as may be expected, is collected in the fluid trap 126.

Degas Hydraulic Fluid (See Box 164 of FIG. 9)

Step 7—Close valve 127 and start the vacuum pump 129. The pump is left running for at least 1 hour which is typically long enough to degas a significant proportion, if not substantially all, of the $N_2$ from the hydraulic fluid.

Step 8—After 1 hour, stop the vacuum pump 129 and close valve 125.

Check/Adjust Fluid Level (See Box 165 of FIG. 9)

Step 9—Using the hand pump raise the pressure reading on the gauge 124 to 5 bar. Hold at this pressure for a suitable length of time (a few minutes or so) and if the pressure falls during this time use the hand pump to restore the pressure to 5 bar. This will ensure that the upper chamber 111 is full of hydraulic fluid.

Step 10—Open Valve 125 and allow the pressure to return to zero on pressure gauge 124 and disconnect hose 122 from quick release coupling 123. Valve 114 is left open. This then concludes the first part of the process, in which the Deflation and Oil Replenishment Tool is used.

After the first part of the process has been completed and the shock absorber 102 is deflated, there is a known amount of degassed hydraulic fluid in the upper chamber 111. It is also known that the upper 111 and lower 112 chambers are exhausted of all gas. In the second part of the service process the inflation kit 119 is used to inject a pre-set mass of $N_2$ into the shock absorber chambers 111, 112. This is achieved by conducting, in order, the following steps, which follow on from those steps (1 to 10) listed above:

Inflate Upper Chamber 111 with Set Mass of Gas (See Box 166 of FIG. 9)

Step 11—Connect a gaseous $N_2$ supply 120 with regulator 139 to quick release coupling 134, ensure that the $N_2$ supply is pressurised to at least 200 bar as shown on gauge 138 before starting the charge process.

Step 12—Set the regulator 139 to show a pressure of 200 bar on pressure gauge 138.

Step 13—Connect the hose/line 122 to quick release coupling 132. It may be necessary to take care not to disturb the hose connection at the charging valve 114; it may be full of hydraulic fluid, but this would be as expected.

Step 14—On the interface panel the user selects the correct landing gear and stage chamber by means of using the user interface selector dial 146, until the desired selection is displayed on the text display screen 147.

Step 15—The user then presses the start button 145 and the upper stage is then charged under the control of the control unit 136. This is indicated by a continuous amber indication light. During this step the gear will lift.

Step 16—When charging of the upper stage is complete close up charging valve 114 and disconnect the hose 122 at 114.

Inflate Lower Chamber with Set Mass of Gas (See Box 167 of FIG. 9), if Gear is Two-Stage Step 17—Attach the flexible hose 122 to the lower charging valve 115 and ensure the valve is open.

Step 18—Select the lower chamber for the correct gear using the interface selector and press the start button 145. The lower chamber 112 is then charged with gas under the control of the control unit 136. This is again indicated by a continuous amber indication light. During this step the gear may lift further.

Step 19—When charging is complete close up the lower stage charging valve 115.

Remove Collar (See Box 168 of FIG. 9)

Step 20—Remove the service collar 5, if fitted in Step 1. The service is then complete.

The controller performs internal checks in real-time to ensure that the charge process follows an orderly path from start to finish and will stop, closing the solenoid and indicating a fault with the red light if any of a number of failure conditions occur. If the control unit 136 senses pressure or temperature readings that are unexpected, for example higher or lower than pre-set thresholds, or that a rate of change of pressure or temperature is detected that is higher or lower than pre-set thresholds, then a fault may be assumed. Examples of particular fault conditions include, but are not limited to:

Lack of sufficient $N_2$ supply pressure or pressure falls below acceptable limit for the charging process;

Lack of progress in charging the shock absorber 102 (rate of pressure rise too low for the chamber) indicating a leak;

Charge rate too high indicating a blockage or restriction in the charging line;

Failure of the solenoid valve to open, failure of either or both pressure transducers.

In steps 14 and 18, the user selects the chamber position and type of shock absorber/landing gear. Each selection is associated, in a look-up table stored in memory accessible by the control unit 136, with a corresponding mass of $N_2$ that is to be delivered to an empty (of gas) chamber of the selected type.

In steps 15 and 18, upon pressing the start button the control unit opens the solenoid valve to allow $N_2$ to flow across orifice 140. The upstream pressure and temperature sensor 141 and the downstream pressure and temperature sensor 142 are read continuously by the control unit. This information is used to derive the mass flow rate across orifice 140. The mass flow rate is then integrated with respect to time (in real-time) to obtain the mass of $N_2$ delivered to the shock absorber 102. When this delivered $N_2$ mass is equal to the correct mass as set in view of the selection made with the control interface, the control unit 136 switches off the solenoid valve halting the flow of gas. Such a means of delivery of $N_2$ is independent of pressures, loads on the gear, temperature and absorption of $N_2$ into the hydraulic fluid. There can therefore be greater confidence than hitherto possible that the amount of $N_2$ in the shock absorbers 102 is appropriate.

The servicing cart 117 allows accurate servicing of the aircraft 101 in a weight on wheels state, taking into account $N_2$ absorption into Hydraulic fluid. Absorption of $N_2$ into the hydraulic fluid in a shock absorber 102 results in a decrease in the mass of gas above the hydraulic fluid in a weight-on-wheels state, compared with (all other things being equal) the mass of gas above the hydraulic fluid, in the weight-off-wheels state (as a result of the gas having degassed from the hydraulic fluid). When the aircraft 101 takes off and the pressure within the shock absorber 102 is relieved it returns, with time, to its pre-landing state. After landing, when the aircraft 101 has come to a rest, the amount of $N_2$ absorbed or otherwise contained in the hydraulic fluid within the shock absorber 102 will be a complex function of the aircraft 101 weight (and thus shock absorber 102 pressure), the surrounding temperature and the extent to which the $N_2$ and fluid have been mixed during landing and taxiing. Thus the H-dimension of the shock absorber 102 is variable with both service condition and aircraft activity. The measurement of the H-dimension of the shock absorber 102 (taken in a weight-on-wheels state) previously used to indicate the mass of gas will often result in an underestimate of the mass of gas in the shock absorber 102. The accuracy of gas level checks based on H-dimension measurements can therefore be the subject of improvement by means of the presently described embodiment and/or such checks based on H-dimension measurements may be rendered redundant/unnecessary. The method of the embodiment also permits replenishment of hydraulic fluid with the aircraft 101 in the weight on wheels state. The equipment on the servicing cart 117 also permits the service process to be carried out for any aircraft weight and centre of gravity condition and is not unduly sensitive to pressure, temperature and friction effects in the shock absorber. The equipment also permits accurate service of not only one-stage, but also two-stage, shock absorbers.

Figure 10A:
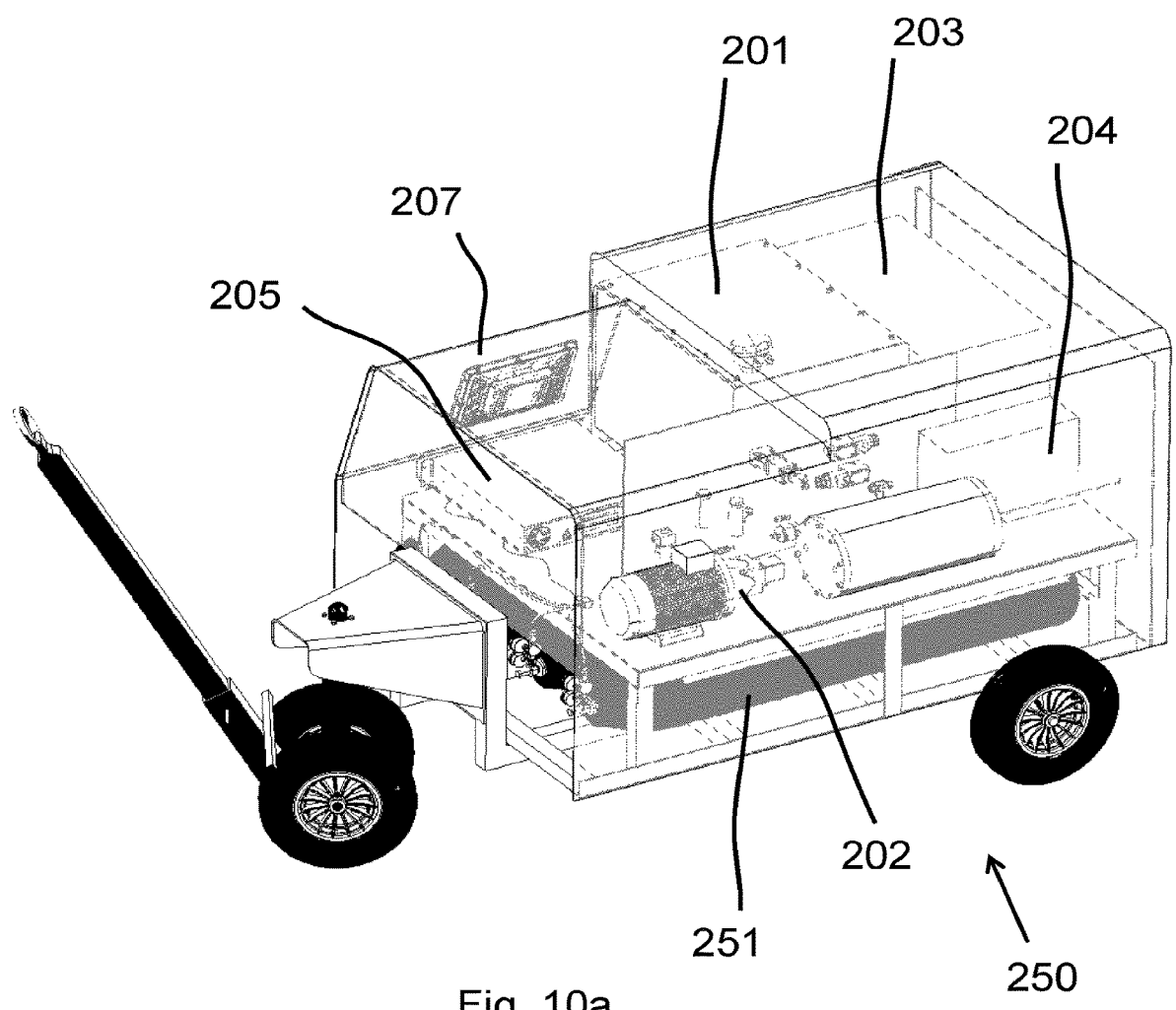
FIGS. 10a and 10b show a portable automated-servicing cart according to a second embodiment of the invention.
Figure 10B:
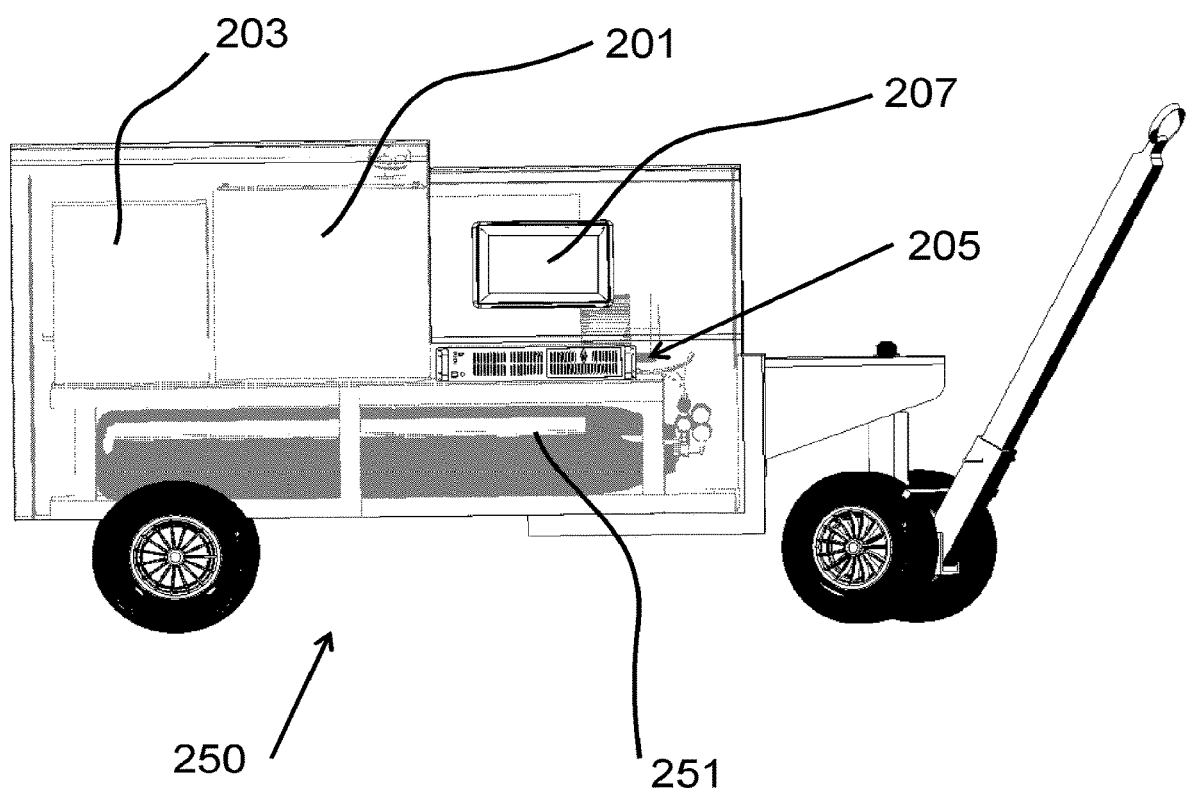
Figure 11:
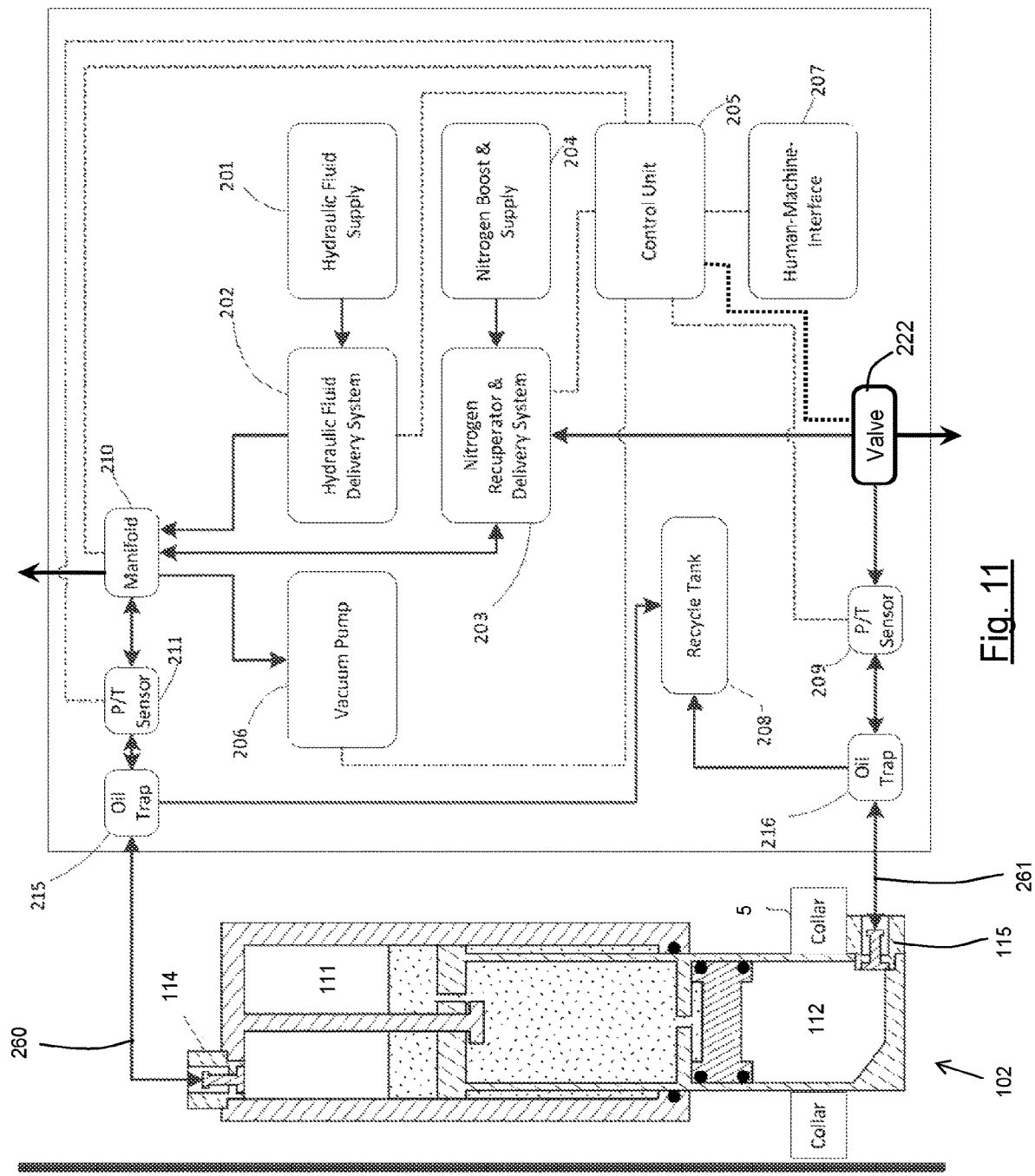
FIG. 11 is a schematic showing in further detail the component parts of the servicing cart of FIGS. 10a and 10b.

The second embodiment of the present invention concerns servicing of an aircraft landing gear shock absorber 102 with the use of a portable servicing cart 250 which is more automated than the first embodiment. A cart 250 is shown in FIGS. 10a and 10b and provides a fully integrated set of servicing equipment that can deflate gas from the shock absorber 102, degas and replenish hydraulic fluid, and inject gas into the shock absorber 102. The cart thus carries pressurised canisters of $N_2$ 251, a source 201 of hydraulic fluid, a gas delivery system 203 and a control system 205 that controls the servicing process. FIG. 11 shows schematically the main parts of the cart 250 attached to a shock absorber 102. There are two connections 260, 261 shown, which are provided by hoses which connect between a connector on the cart and a connector on the shock absorber 102. Thus there is a first connection 260 between a connector on the cart and the connector associated with the upper (main) chamber 111 of the shock absorber which contains both hydraulic fluid and gas. There is a further connection 261 between another connector on the cart and the connector associated with the second, lower, chamber 112 of the shock absorber which contains only gas. Each connector on the cart has an associated oil trap 215, 216 for collecting hydraulic fluid that may inadvertently be carried with gas. A pressure gauge/temperature sensor 209, 211 is provided next to each oil trap 215, 216. Any hydraulic fluid caught by either oil trap is fed to a recycling tank 208.

A gas delivery system 203 includes a gas tank for capturing and storing $N_2$ gas from the shock absorber 102. A vacuum pump 206 is provided for drawing $N_2$ out of solution from the fluid. The same gas tank is used to hold a predetermined mass of $N_2$ for delivery via the manifold 210 to the shock absorber 102. The gas tank is connected to a supply of $N_2$ for this purpose. The gas tank has a hydraulically powered actuation system, which is capable of emptying the tank completely of the gas held within it. The gas tank includes pressure and temperature sensors which together with knowledge of the internal volume of the tank can be used to calculate the mass of the $N_2$.

A hydraulic fluid reservoir 201 and associated fluid delivery system 202 are also connected to the manifold 210 for supplying hydraulic fluid to the shock absorber 102. The gas vacuum pump 206, gas delivery system 203, hydraulic fluid delivery system 202, the manifold 210 and the various sensors are connected to a control unit 205, which is itself connected to a human interface unit 207. In this case, the human interface unit 207 is in the form of a touch sensitive display screen.

A method of servicing a shock absorber 102 using the portable servicing cart 250 of the second embodiment will now be described.

The semi-automatic process includes both manual steps (represented by box 320) conducted before and after an otherwise automatic process (represented by box 310). At the start 321 of the servicing process, the operator of the cart inputs details of the gear into the Human-Machine-Interface (HMI) 207, attaches the supporting collar 5 to the gear, and connects the two hoses to the shock absorber charge valves 114, 115. These steps are represented by box 322 in FIG. 12. The operator then opens the charge valves (step 323) and then presses the 'Start' button (step 324) on the Human-Machine-Interface 207 to begin the automatic service process (represented by box 310). The system then automatically services the shock absorber in accordance with the steps described below (and illustrated in FIG. 12). It will be appreciated that Steps 1 and 6 are not applicable (and therefore not performed) for single-stage shock absorbers.

Step 1: Venting of the Lower Chamber 112 (Box 301 in FIG. 12)

The $N_2$ in the lower chamber 112 is deflated via the manifold 210 into the $N_2$ tank of the gas delivery system 203. The actuator in the tank can be used at this stage to gradually increase the volume of the tank, thus creating a negative pressure (relative to the pressure of gas in the shock absorber) thus drawing gas into the tank. It may be that below a certain pressure this process will stop, as the pressure in the tank equalises (and can not be lowered further by expanding further the volume of the tank) with the pressure in the shock absorber 102. In such a condition, the remaining gas in the shock absorber 102 (still under pressure) is then allowed to vent to atmosphere by means of operating valve 222. This valve 222 will be closed when the connecting transducer 209 reads 1 bar absolute pressure, indicating that the lower chamber 112 has been fully depressurised. Orifices (not shown in FIG. 11) are installed in the $N_2$ lines to limit the rate of depressurisation and thereby control the descent rate of the gear. The line contains an oil trap 216 which is monitored for excessive leakage across the floating (separator) piston. Any recovered oil (hydraulic fluid) will be sent to the recycle tank 208.

Step 2: Venting of Upper Unseparated Chamber 111 (Box 302 in FIG. 12)

The $N_2$ in the upper-stage chamber 111 is captured and stored in the $N_2$ tank of the gas delivery system 203 for later reuse in the service process. Below a certain pressure this process will stop, as the pressure in the tank equalises with the pressure in the shock absorber 102. The remaining gas in the shock absorber 102 (still under pressure) is then allowed to vent to atmosphere by means of operating the valves (not shown) associated with the manifold 210. In the final stages of depressurisation (within the context of this step, step 2) oil is expelled and collected in the oil trap 215 and sent to the recycle tank 208.

It may be at this stage (or during step 2) that the special collar 5 performs its function. The collar 5 serves two purposes. The first purpose is to act as an in-stop to precisely fix the internal volume of the main chamber 111, which enables the cart 250 to fill the main chamber 111 with the correct volume of hydraulic fluid—see below. The second purpose is that it will provide structural support to the gear, when deflated. It will facilitate the safe deflation, in conjunction with the control provided by the control unit 205, of the shock absorber chambers of $N_2$ so that the gear descends onto this collar 5.

Step 3: $N_2$ Degassing (Box 303 in FIG. 12)

Residual $N_2$ contained in the hydraulic fluid following deflation of the gear is then removed by application of a vacuum pump 206. The vacuum is pressure-regulated to ensure that it does not fall below the vapour pressure of the hydraulic fluid. The vacuum pump 206 is operated to apply a partial vacuum (at an absolute pressure of say around 0.1 bar) to the shock absorber upper unseparated chamber 111. The vacuum pump 206 is kept running for a set time period (about 60 minutes) to desorb $N_2$ from the hydraulic fluid. The $N_2$ that degasses is vented to atmosphere. When this set period is complete vacuuming is stopped. On completion of this vacuum process there will be very little gas in the chamber and a certain amount of hydraulic fluid.

Step 4: Hydraulic Fluid Replenishment (Box 304 in FIG. 12)

During steps 2 and 3, (the final stage of descent and de-pressurisation) hydraulic fluid will be forced out of the shock absorber 102 via the charge/discharge line due to displacement action caused by gas bubble evolution from the super-saturated liquid (rather like opening a bottle of carbonated drink). The action will create a hydraulic fluid deficit and one or more cavities in the landing gear chamber. Such cavities form a small minority of the space in the chamber (the rest being filled by hydraulic fluid) and will be in a condition close to a vacuum (i.e. at an absolute pressure of close to 0.1 bar). In Step 4, the hydraulic fluid is thus replenished under pressure.

The hydraulic delivery system 202 is operated to deliver hydraulic fluid from the on-board supply 201 to the upper-stage chamber 111 of the gear. The pumping is stopped when a set pressure is reached in the delivery line, as measured by the connecting transducer 211. This step (step 4) occurs immediately after the vacuum process (step 3) has been completed, so it can be assumed that the gas contained in the shock absorber 102 is negligible (i.e. there is a partial vacuum such that, as a practical matter, all gas will have been exhausted from the chamber). By filling the shock absorber 102 with hydraulic fluid to the set pressure (which is at about 5 bar, say) from such a vacuum state, it can be known with reasonably high accuracy the volume of hydraulic fluid and the amount (negligible) of gas in the shock absorber 102. The previous vacuum state thus facilitates correct hydraulic fluid intake. The set delivery pressure is chosen to ensure that hydraulic fluid fills the available space and that there is sufficient pressure to overcome line resistance and compress any pre-existing cavities to a negligible volume without causing any gear movement or change of volume.

Step 5: $N_2$ Replenishment in Upper-Stage Chamber 111 (Box 305 in FIG. 12)

The mass of $N_2$ required in the upper-stage chamber 111 is retrieved from a lookup table stored in the memory of the control unit 205. This target mass will be made up from the $N_2$ recovered in the gas tank and (as much as is required) gas added from the on-board $N_2$ supply. The volume of the gas tank is known. With knowledge of the pressure and temperature of the gas in the tank it is then possible to know with relative high accuracy the mass of $N_2$ in the tank. The tank can thus be filled until the pressure and temperature are indicative of the mass of gas in the tank having reached the target mass. This mass of $N_2$ is then injected by the $N_2$ delivery system 203 into the upper-stage chamber 111, by means of actuating the hydraulically powered actuation system.

Pressure checks are performed to ensure that these remain within safe limits so that in the event of a blockage or loss of pressure due to leakage, such an event may be quickly detected.

Step 6: $N_2$ Replenishment in Lower-Stage Chamber 112 (Box 306 in FIG. 12)

For two-stage gears the mass of $N_2$ required in the lower separated chamber 112 will be retrieved from a lookup table stored in the memory of the control unit. This pre-set mass of $N_2$ will then be received in the tank, and then injected by the $N_2$ delivery system 203 into the lower chamber 112.

Once Step 6 is complete, the control unit 205 causes (step 307) the display of an on-screen message to let the operator know that the automated part 310 of the service process is finished.

The manual operator then closes the shock absorber charge valves 114, 115 (step 325) and detaches the hose 122 (step 326) and supporting collar 5 from the gear (also step 326). Step-by-step instructions for this are provided by means of an appropriate video and audio commentary on the HMI. Proximity sensors (not shown) are provided to indicate that all hoses and collars are correctly stowed before the cart indicates that the process is complete (also indicated by an appropriate display on the HMI).

During the process, the control unit 205 receives temperature and pressure signals from various sensors and monitors such signals for unexpected values.

The servicing process may thus be conducted by a single manual operator. The operator need only connect and disconnect certain attachments to the landing gear at the start and at the end of the automated service process. No further intervention is required unless a fault occurs.

It will be seen that with the use of the cart 250 of the second embodiment, pressurised $N_2$ is recovered into a special tank 208. Reusing the $N_2$ in this way limits the rate at which the cart's $N_2$ supply is used up, improving availability of the cart 250 and reducing the frequency of $N_2$ bottle replacement. This cart 250 contains a $N_2$ boost pump 204 to further reduce the frequency of $N_2$ bottle replacement, by means of using as much $N_2$ from the bottles as possible. The boost pump achieves this by means of enabling $N_2$ to be supplied from the bottles at below service pressure (i.e. using the boost pump to pump out $N_2$ from the bottles).

The automated servicing cart 250 offers several benefits, which will now be explained.

The automated servicing cart 250 enables accurate weight on wheels servicing of both $N_2$ and hydraulic fluid. This may reduce operator costs as $N_2$ and hydraulic fluid replenishment can be carried out on ramp during turn-around of the aircraft 101 (i.e. the aircraft will not need to be taken out of revenue service for the shock absorber $N_2$ and hydraulic fluid levels to be restored to within acceptable operating limits).

The automated servicing cart 250 significantly reduces the number of manual actions required by the maintainer. This may reduce the likelihood of human error resulting in mis-serviced gears.

The process accounts for $N_2$ absorption in unseparated chambers and so removes potential service errors associated with this phenomenon. This will reduce the risk of a mis-serviced condition.

Some gear have more than one inlet/exit valve on a given chamber to allow through-flushing of hydraulic fluid, which could be used to provide a means of mitigating $N_2$ absorption. The design of the servicing cart 250 does not need or use these additional valves as vacuuming is considered a more effective and efficient means for dealing with the recognised $N_2$ absorption issue.

The embodiments described will work equally well on separated and unseparated chambers as the actual mass of gas injected will be invariant of the actual chamber conditions.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Aspects of the first embodiment may be used in the second embodiment and vice versa.

The servicing cart 250, of the second embodiment for example, could be wirelessly connected to the internet so that data could be downloaded for a given new gear type. Such data may include details of the pre-set mass of gas required for the given new gear type. Also, such a wireless connection could be used to send data from the servicing cart for the purpose of health monitoring. For example, data may include frequency of servicing of the particularly landing gear and/or the amount of gas exhausted from a given landing gear shock absorber.

The servicing cart 250, of the second embodiment for example, could read the gear type using a number of automated methods including a bar-code scanner, Radio Frequency Identification (RFID) tag or Optical Character Recognition of a digital image of the Part/Serial Number plate on the gear. This could then be used to set the parameters for the gear being serviced.

The correct mass of $N_2$ could be injected using a hydraulically actuated variable volume tank by knowing and then monitoring the volume, pressure and temperature until such time as the differences between starting conditions and end conditions are indicative of having injected the correct mass of gas is provided for the given chamber.

The apparatus may be arranged to service a single type of suspension strut or a plurality of different suspension struts that may include single or multiple stage struts.

Some aircraft may comprise landing gear with different struts, for example, between the nose landing gear and the main landing gear.

The servicing cart 250 described above is a mobile system and comprises wheels. There may also be provided a braking system, a handle for manual movement or means for powering the wheels, a steering system, a power supply or protective bodywork systems. The servicing cart 250 may be coupled to or integrated with another ground system associated with aircraft servicing.

It will be understood by those skilled in the art that the processing functionality of the apparatus that embodies a part or all of the presently described embodiments of the invention (for example the control unit described herein) may be a general purpose device having software arranged to provide a part or all of such functionality. The device could be a single device or a group of devices and the software could be a single program or a set of programs. Furthermore, any or all of the software used to implement the invention can be communicated via any suitable transmission or storage means so that the software can be loaded onto one or more devices.

To ensure that the correct process is followed, interactive video could be used to provide the operator with hose and service collar attachment instructions, and/or closing up and disconnection procedures.

The servicing cart may also be of benefit when servicing separated shock absorbers. For example, an embodiment may provide a portable apparatus for servicing a shock absorber on a landing gear assembly of an aircraft when the aircraft is in a weight on wheels configuration, the shock absorber comprising at least one chamber containing hydraulic fluid and at least one chamber containing gas, not necessarily in fluid communication with the fluid. Such an apparatus may comprise a source of gas, a source of hydraulic fluid, and a gas delivery system for delivering a pre-set mass of gas into the shock absorber.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A portable apparatus for servicing a shock absorber on a landing gear assembly of an aircraft, the shock absorber comprising at least one chamber containing both hydraulic fluid and a gas in fluid communication with each other, the portable apparatus comprising:
   a source of gas,
   a source of hydraulic fluid, and
   a gas delivery system for delivering a pre-set mass of gas into the shock absorber.

2. An apparatus according to claim 1, wherein the apparatus further comprises a vacuum pump for exhausting gas from said at least one chamber.

3. An apparatus according to claim 1, wherein the apparatus includes a fluid trap for collecting hydraulic fluid that may flow out of the chamber as a gas is exhausted.

4. An apparatus according to claim 1, wherein the apparatus further comprises a pump for delivering hydraulic fluid to the shock absorber from the reservoir.

5. An apparatus according to claim 1, wherein the apparatus is provided on a single servicing cart, which is arranged to transport all of the parts of the apparatus to and from an aircraft in a weight on wheels state.

6. An apparatus according to claim 1, wherein the apparatus includes one or more collars, each collar being arranged to stop contraction of a particular type of shock absorber and being able to sustain the compressive loads of the same magnitude as those sustained by the shock absorber in the weight-on-wheels state.

7. An apparatus according to claim 1, wherein the gas delivery system for delivering the pre-set mass of gas into the shock absorber comprises a regulator that is configured to measure or regulate a rate of injection of mass of gas per unit time.

8. An apparatus according to claim 7, wherein the gas delivery system measures the mass flow rate by using an orifice flow meter.

9. An apparatus according to claim 1, wherein the apparatus includes a control unit configured to control processes effected by the apparatus including one or more of
   exhausting of gas from the chamber,
   degassing of dissolved gas from the hydraulic fluid,
   deciding whether to adjust the amount of hydraulic fluid in the chamber,
   adjusting the amount of hydraulic fluid in the chamber if necessary, and
   delivering of the pre-set mass of gas into the chamber.

10. An apparatus according to claim 1, wherein the apparatus includes a control unit configured to monitor, during use of the apparatus, inputs including inputs concerning both temperature and pressure from sensors for conditions suggestive of a fault.

11. An apparatus for servicing a shock absorber on a landing gear assembly of an aircraft, the shock absorber comprising at least one chamber containing both hydraulic fluid and a gas in fluid communication with each other, wherein the apparatus is provided on and in the form of a portable cart, the apparatus comprises a vacuum pump configured for degassing dissolved gas from hydraulic fluid in a chamber of the shock absorber, the apparatus comprises a source of hydraulic fluid for replenishing the hydraulic fluid in the chamber, the apparatus comprises a source of gas for replacing the gas in the chamber, and the apparatus comprises a gas delivery system which includes a control unit, the gas delivery system being configured to deliver a pre-set mass of gas into the shock absorber under the control of the control unit.

12. An apparatus according to claim 11, wherein the apparatus further comprises a hydraulic fluid trap which is associated with the vacuum pump and which traps hydraulic fluid when the vacuum pump degasses dissolved gas from hydraulic fluid in the chamber of the shock absorber.

13. A portable cart for servicing a shock absorber on a landing gear assembly of an aircraft when the aircraft is in a weight on wheels configuration, the shock absorber comprising at least one chamber containing both hydraulic fluid and a gas in fluid communication with each other, wherein the cart comprises:

a vacuum pump configured for degassing dissolved gas from hydraulic fluid in a chamber of the shock absorber, a source of hydraulic fluid for replenishing the hydraulic fluid in the chamber, a source of gas for replacing the gas in the chamber, and a control unit which is configured to control delivery of gas into the shock absorber so that a total mass of gas delivered into the shock absorber corresponds to a target sum total of mass of gas within the shock absorber.

14. A portable cart according to claim 13, wherein the control unit includes a memory in which data representing a target sum total of mass of gas within the shock absorber is stored.

15. A portable cart according to claim 14, wherein data in the memory represents different target sum totals of masses of gas required for different types of landing gear shock absorbers.

16. A portable cart according to claim 13, wherein the cart includes one or more collars, each collar being arranged to stop contraction of a particular type of shock absorber and being able to sustain the compressive loads of the same magnitude as those sustained by the shock absorber in the weight-on-wheels state.

17. A portable cart according to claim 13, wherein the control unit is arranged to control a regulator that measures or regulates the rate of delivery of mass of gas per unit time into the shock absorber.

* * * * *